(12) United States Patent
Hansen et al.

(10) Patent No.: US 8,902,193 B2
(45) Date of Patent: Dec. 2, 2014

(54) INTERACTIVE INPUT SYSTEM AND BEZEL THEREFOR

(75) Inventors: Jeremy Hansen, Calgary (CA); Trevor R. Wellington, Calgary (CA); Mark Slevinsky, Calgary (CA)

(73) Assignee: SMART Technologies ULC (CA)

( * ) Notice: Subject to any disclaimer, the term of this patent is extended or adjusted under 35 U.S.C. 154(b) by 1613 days.

(21) Appl. No.: 12/118,545

(22) Filed: May 9, 2008

(65) Prior Publication Data

US 2009/0277694 A1 Nov. 12, 2009

(51) Int. Cl.
*G06F 3/042* (2006.01)

(52) U.S. Cl.
CPC .................................. *G06F 3/0421* (2013.01)
USPC ....................................................... 345/175

(58) Field of Classification Search
USPC .................................. 345/156–184; 359/359
See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| 4,639,720 A | 1/1987 | Rympalski et al. |

(Continued)

FOREIGN PATENT DOCUMENTS

| | | |
|---|---|---|
| AU | 2003233728 A1 | 12/2003 |
| AU | 2006243730 A1 | 11/2006 |

(Continued)

OTHER PUBLICATIONS

English Translation of Decision of Rejection for Japanese Patent Application No. 2002-507309, date of Decision: Aug. 18, 2011, 9 pages.

(Continued)

*Primary Examiner* — Dennis Joseph

(74) *Attorney, Agent, or Firm* — Katten Muchin Rosenman LLP

(57) ABSTRACT

An interactive input system comprises a bezel at least partially surrounding a region of interest. The bezel has a plurality of bands thereon with at least some adjacent bands having different optical properties. At least one imaging device looks into the region of interest and sees the at least one bezel so that acquired images comprise regions corresponding to the bands. Processing structure processes pixels of a plurality of the regions to detect the existence of a pointer in the region of interest.

16 Claims, 15 Drawing Sheets

(56) References Cited

U.S. PATENT DOCUMENTS

| | | |
|---|---|---|
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,854,491 A | 12/1998 | Pryor et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,144,366 A | 11/2000 | Numazaki et al. |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,232,962 B1 | 5/2001 | Davis et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |

(56) References Cited

U.S. PATENT DOCUMENTS

| | | |
|---|---|---|
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,504,532 B1 | 1/2003 | Ogasahara et al. |
| 6,507,339 B1 | 1/2003 | Tanaka |
| 6,512,513 B2 | 1/2003 | Fleck et al. |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,778,207 B1 | 8/2004 | Lee et al. |
| 6,803,906 B1 | 10/2004 | Morrison et al. |
| 6,828,959 B2 | 12/2004 | Takekawa et al. |
| 6,829,372 B2 | 12/2004 | Fujioka |
| 6,864,882 B2 | 3/2005 | Newton |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,859 B1 | 8/2006 | Pryor |
| 7,084,868 B2 | 8/2006 | Farag et al. |
| 7,098,392 B2 | 8/2006 | Sitrick et al. |
| 7,121,470 B2 | 10/2006 | McCall et al. |
| 7,151,533 B2 | 12/2006 | Van Iperen |
| 7,176,904 B2 | 2/2007 | Satoh |
| 7,184,030 B2 | 2/2007 | McCharles et al. |
| 7,187,489 B2 | 3/2007 | Miles |
| 7,190,348 B2 | 3/2007 | Kennedy et al. |
| 7,190,496 B2 | 3/2007 | Klug et al. |
| 7,202,860 B2 | 4/2007 | Ogawa |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman et al. |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,619,617 B2 | 11/2009 | Morrison et al. |
| 7,692,625 B2 | 4/2010 | Morrison et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0210803 A1 | 11/2003 | Kaneda et al. |
| 2003/0227492 A1 | 12/2003 | Wilde et al. |
| 2003/0234346 A1 | 12/2003 | Kao |
| 2004/0001144 A1 | 1/2004 | McCharles et al. |
| 2004/0012573 A1 | 1/2004 | Morrison et al. |
| 2004/0021633 A1 | 2/2004 | Rajkowski |

(56) References Cited

U.S. PATENT DOCUMENTS

| | | |
|---|---|---|
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0071363 A1 | 4/2004 | Kouri et al. |
| 2004/0108990 A1 | 6/2004 | Lieberman |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0190162 A1 | 9/2005 | Newton |
| 2005/0241929 A1 | 11/2005 | Auger et al. |
| 2005/0243070 A1* | 11/2005 | Ung et al. ............ 345/176 |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0034486 A1 | 2/2006 | Morrison et al. |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0192799 A1 | 8/2006 | Vega et al. |
| 2006/0197749 A1 | 9/2006 | Popovich |
| 2006/0202953 A1 | 9/2006 | Pryor et al. |
| 2006/0227120 A1 | 10/2006 | Eikman |
| 2006/0244734 A1 | 11/2006 | Hill et al. |
| 2006/0274067 A1 | 12/2006 | Hikai |
| 2006/0279558 A1 | 12/2006 | Van Delden et al. |
| 2007/0002028 A1 | 1/2007 | Morrison et al. |
| 2007/0019103 A1 | 1/2007 | Lieberman et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0139932 A1 | 6/2007 | Sun et al. |
| 2007/0152984 A1 | 7/2007 | Ording et al. |
| 2007/0152986 A1 | 7/2007 | Ogawa et al. |
| 2007/0165007 A1 | 7/2007 | Morrison et al. |
| 2007/0167709 A1 | 7/2007 | Slayton et al. |
| 2007/0205994 A1 | 9/2007 | van Ieperen |
| 2007/0236454 A1 | 10/2007 | Ung et al. |
| 2007/0269107 A1 | 11/2007 | Iwai et al. |
| 2007/0273842 A1 | 11/2007 | Morrison |
| 2007/0290996 A1 | 12/2007 | Ting |
| 2007/0291125 A1 | 12/2007 | Marquet |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0259050 A1 | 10/2008 | Lin et al. |
| 2008/0259052 A1 | 10/2008 | Lin et al. |
| 2009/0058832 A1 | 3/2009 | Newton |
| 2009/0058833 A1 | 3/2009 | Newton |
| 2009/0146972 A1 | 6/2009 | Morrison et al. |
| 2009/0200384 A1* | 8/2009 | Masalkar ............ 235/494 |

FOREIGN PATENT DOCUMENTS

| | | |
|---|---|---|
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 0125068 A2 | 11/1984 |
| EP | 0 279 652 A2 | 8/1988 |
| EP | 0 347 725 A2 | 12/1989 |
| EP | 0420335 | 4/1991 |
| EP | 0 657 841 A1 | 6/1995 |
| EP | 0 762 319 A2 | 3/1997 |
| EP | 0 829 798 A2 | 3/1998 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 | 1/2006 |
| EP | 1674977 | 6/2006 |
| EP | 1 297 488 B1 | 11/2006 |
| EP | 1741186 | 1/2007 |
| EP | 1766501 | 3/2007 |
| EP | 1830248 A1 | 9/2007 |
| EP | 1877893 | 1/2008 |
| ES | 2279823 T3 | 9/2007 |
| GB | 1575420 | 9/1980 |
| GB | 2176282 A | 5/1986 |
| GB | 2204126 A | 11/1988 |
| GB | 2263765 A | 8/1993 |
| JP | 57-211637 A | 12/1982 |
| JP | 61-196317 A | 8/1986 |

(56) References Cited

FOREIGN PATENT DOCUMENTS

| | | |
|---|---|---|
| JP | 61-260322 A | 11/1986 |
| JP | 62-005428 | 1/1987 |
| JP | 63-223819 | 9/1988 |
| JP | 3-054618 A | 3/1991 |
| JP | 03-244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |
| JP | 5-197810 A | 8/1993 |
| JP | 06-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 10-222646 A | 8/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282456 A | 10/2001 |
| JP | 2001-282457 A | 10/2001 |
| JP | 2002-055770 | 2/2002 |
| JP | 2002-236547 A | 8/2002 |
| JP | 2003-65716 A | 3/2003 |
| JP | 2003-158597 A | 5/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A1 | 8/2004 |
| WO | 2004/090706 A2 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | 2005/106775 A1 | 11/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/051633 A1 | 5/2010 |

OTHER PUBLICATIONS

International Preliminary Report on Patentability, PCT/NZ2004/000029, May 20, 2005 (21 pages).
International Preliminary Report on Patentability, PCT/US2008/060102, Oct. 22, 2009 (9 pages).
International Search Report for PCT/CA2010/001085 mailed Oct. 12, 2010 (5 pages).
International Application U.S. Appl. No. PCT/US2008/060102, Search Report & Written opinion mailed Feb. 12, 2009 (14 pages).
International Application Serial No. PCT/US2008/074749, Search Report & Written Opinion mailed Feb. 11, 2009 (10 pages).
International Application Serial No. PCT/US2008/074755, International Search Report and Written Opinion mailed Jan. 29, 2009 (14 pages).
International Search Report for PCT/NZ05/00092 Sep. 27, 2006 (4 pages).
Loinaz et al., "A 200-mW, 3.3-V, CMOS Color Camera IC Producing 352×288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
"White Paper", Digital Vision Touch Technology, Feb. 2003.
International Search Report for PCT/CA2008/001350 mailed Oct. 17, 2008 (5 Pages).
International Search Report and Written Opinion for PCT/CA2007/002184 mailed Mar. 13, 2008 (13 Pages).
International Search Report and Written Opinion for PCT/CA2004/001759 mailed Feb. 21, 2005 (7 Pages).
International Search Report for PCT/CA01/00980 mailed Oct. 22, 2001 (3 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 20067 (2 pages).
European Search Report for EP 06 01 9269 dated Nov. 9, 2006 (4 pages).
European Search Report for EP 06 01 9268 dated Nov. 9, 2006 (4 pages).
European Search Report for EP 04 25 1392 dated Jan. 11, 2007 (2 pages).
European Search Report for EP 02 25 3594 dated Dec. 14, 2005 (3 pages).
Partial European Search Report for EP 03 25 7166 dated May 19, 2006 (4 pages).
May 12, 2009 Office Action for Canadian Patent Application No. 2,412,878 (4 pages).

(56) References Cited

OTHER PUBLICATIONS

Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).

Funk, Bud K., CCD's in optical panels deliver high resolution, Electronic Design, Sep. 27, 1980, pp. 139-143.

Hartley, R. and Zisserman, A., "Multiple View Geometry in Computer Vision", Cambridge University Press, First published 2000, Reprinted (with corrections) 2001, pp. 70-73, 92-93, and 98-99.

Kanatani, K., "Camera Calibration", Geometric Computation for Machine Vision, Oxford Engineering Science Series, vol. 37, 1993, pp. 56-63.

Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.

Wang, F., et al., "Stereo camera calibration without absolute world coordinate information", SPIE, vol. 2620, pp. 655-662, Jun. 14, 1995.

Wrobel, B., "minimum Solutions for Orientation", Calibration and Orientation of Cameras in Computer Vision, Springer Series in Information Sciences, vol. 34, 2001, pp. 28-33.

Press Release, "IntuiLab introduces IntuiFace, An interactive table and its application platform" Nov. 30, 2007.

Overview page for IntuiFace by IntuiLab, Copyright 2008.

NASA Small Business Innovation Research Program: Composite List of Projects 1983-1989, Aug. 1990.

*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).

Transmittal; International Search Report; and Written Opinion of the International Searching Authority for International Application No. PCT/CA2009/000643.

Jul. 5, 2010 Office Action, with English translation, for Japanese Patent Application No. 2005-000268 (6 pages).

Villamor et al. "Touch Gesture Reference Guide", Apr. 15, 2010.

Office Action for Mexican Patent Application No. MX/a/20120/012263 with a Feb. 20, 2012 cover letter summarizing the office action in English.

Chinese Office Action dated Sep. 3, 2012.

Supplementary European Search Report for European Patent Application No. 09 74 1639 with a completion date of Oct. 22, 2012.

\* cited by examiner

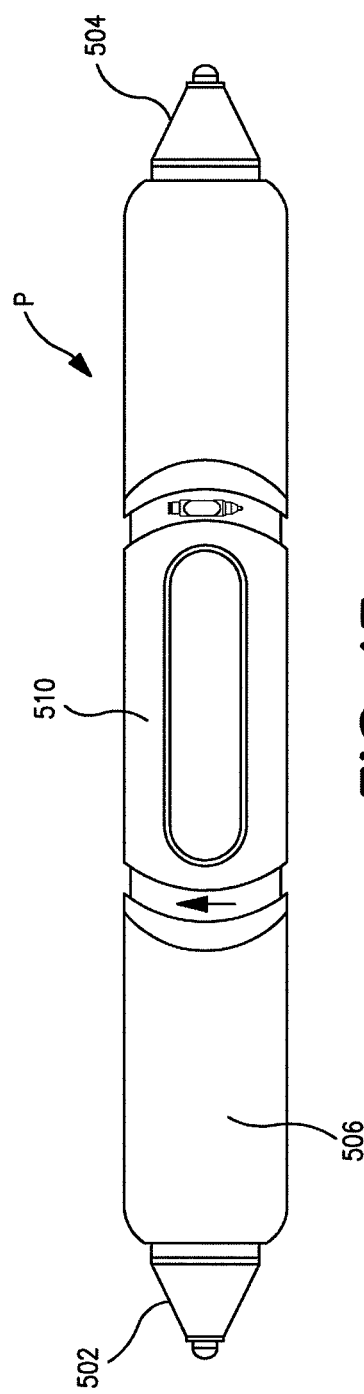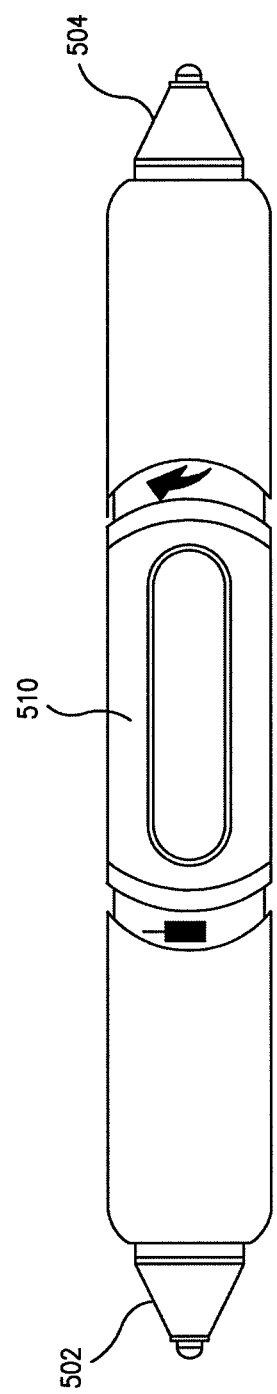
FIG. 17a
FIG. 17b

INTERACTIVE INPUT SYSTEM AND BEZEL THEREFOR

FIELD OF THE INVENTION

The present invention relates to an interactive input system and to a bezel therefor.

BACKGROUND OF THE INVENTION

Interactive input systems that allow users to input ink into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Patent Application Publication No. 2004/0179001 to Morrison et al. discloses a touch system and method that differentiates between passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally along the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

In order to determine the type of pointer used to contact the touch surface, in one embodiment a curve of growth method is employed to differentiate between different pointers. During this method, a horizontal intensity profile (HIP) is formed by calculating a sum along each row of pixels in each acquired image thereby to produce a one-dimensional profile having a number of points equal to the row dimension of the acquired image. A curve of growth is then generated from the HIP by forming the cumulative sum from the HIP.

Although passive touch systems provide some advantages over active touch systems and work extremely well, using both active and passive pointers in conjunction with a touch system provides more intuitive input modalities with a reduced number of processors and/or processor load.

Camera-based touch systems having multiple input modalities have been considered. For example, U.S. Pat. No. 7,202,860 to Ogawa discloses a camera-based coordinate input device allowing coordinate input using a pointer or finger. The coordinate input device comprises a pair of cameras positioned in the upper left and upper right corners of a display screen. The field of view of each camera extends to a diagonally opposite corner of the display screen in parallel with the display screen. Infrared emitting diodes are arranged close to the imaging lens of each camera and illuminate the surrounding area of the display screen. An outline frame is provided on three sides of the display screen. A narrow-width retro-reflection tape is arranged near the display screen on the outline frame. A non-reflective reflective black tape is attached to the outline frame along and in contact with the retro-reflection tape. The retro-reflection tape reflects the light from the infrared emitting diodes allowing the reflected light to be picked up as a strong white signal. When a user's finger is placed proximate to the display screen, the finger appears as a shadow over the image of the retro-reflection tape.

The video signals from the two cameras are fed to a control circuit, which detects the border between the white image of the retro-reflection tape and the outline frame. A horizontal line of pixels from the white image close to the border is selected. The horizontal line of pixels contains information related to a location where the user's finger is in contact with the display screen. The control circuit determines the coordinates of the touch position, and the coordinate value is then sent to a computer.

When a pen having a retro-reflective tip touches the display screen, the light reflected therefrom is strong enough to be registered as a white signal. The resulting image is not discriminated from the image of the retro-reflection tape. However, the resulting image is easily discriminated from the image of the black tape. In this case, a line of pixels from the black image close to the border of the outline frame is selected. Since the signal of the line of pixels contains information relating to the location where the pen is in contact with the display screen. The control circuit determines the coordinate value of the touch position of the pen and the coordinate value is then sent to the computer.

Although Ogawa is able to determine the difference between two passive pointers, the number of input modalities is limited to relatively few types of pointers such as pen and finger inputs. More pointers are capable using polarization techniques; however, these techniques require proper orientation when the pointer contacts the display screen in order to avoid confusion with other pointer modalities.

It is therefore an object of the present invention at least to provide a novel interactive input system and a novel bezel therefor.

SUMMARY OF THE INVENTION

Accordingly, in one aspect there is provided an interactive input system comprising a bezel at least partially surrounding a region of interest, the bezel having a plurality of bands thereon with at least some adjacent bands having different optical properties, at least one imaging device looking into the region of interest and seeing the at least one bezel so that acquired images comprise regions corresponding to the bands, and processing structure processing pixels of a plurality of the regions to detect the existence of a pointer in the region of interest.

In one embodiment, the processing structure processes the pixels to detect discontinuities in the regions caused by the existence of the pointer. In one embodiment, the bands are generally horizontal and comprise at least one band that reflects illumination and at least one band that absorbs illumination. The band that reflects illumination may be a band of retro-reflective material.

In one embodiment, the bezel at least partially surrounds a generally planar surface. The generally planar surface may be a display surface.

According to another aspect there is provided an interactive input system comprising a bezel at least partially surrounding a region of interest, the bezel having a plurality of bands thereon with at least some adjacent bands having different optical properties, at least one imaging device looking into the region of interest and seeing the bezel, and processing structure communicating with the at least one imaging device and processing image data corresponding to a plurality of the bands to detect the existence of a pointer in the region of interest irrespective of pointer type.

BRIEF DESCRIPTION OF THE DRAWINGS

Embodiments will now be described more fully with reference to the accompanying drawings in which:

FIGS. 17a and 17b are side elevational views of yet another pen tool for use in conjunction with the interactive input system of FIG. 1;

DETAILED DESCRIPTION OF THE EMBODIMENTS

Figure 1:
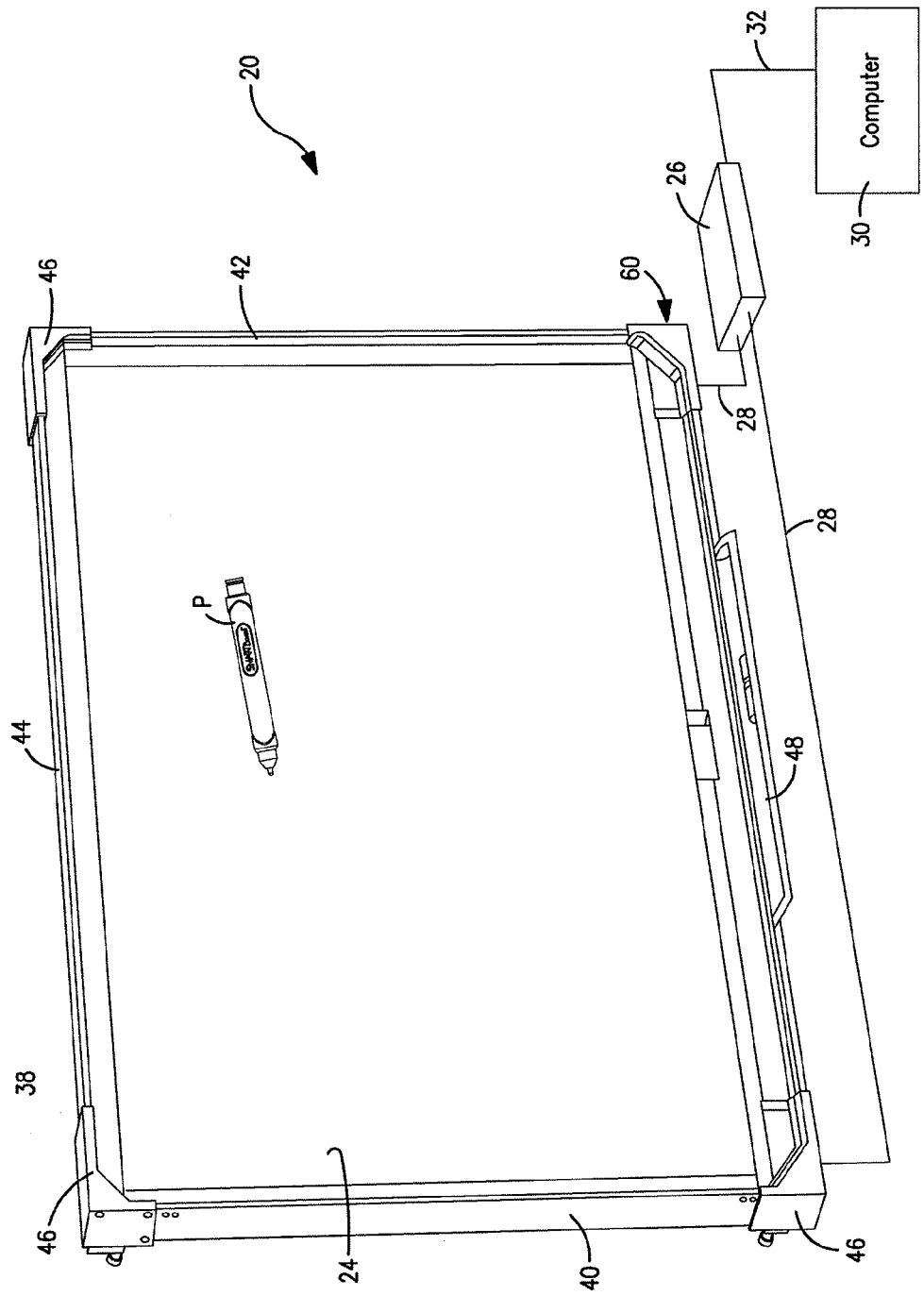
FIG. 1 is a perspective view of an interactive input system.
Figure 2:
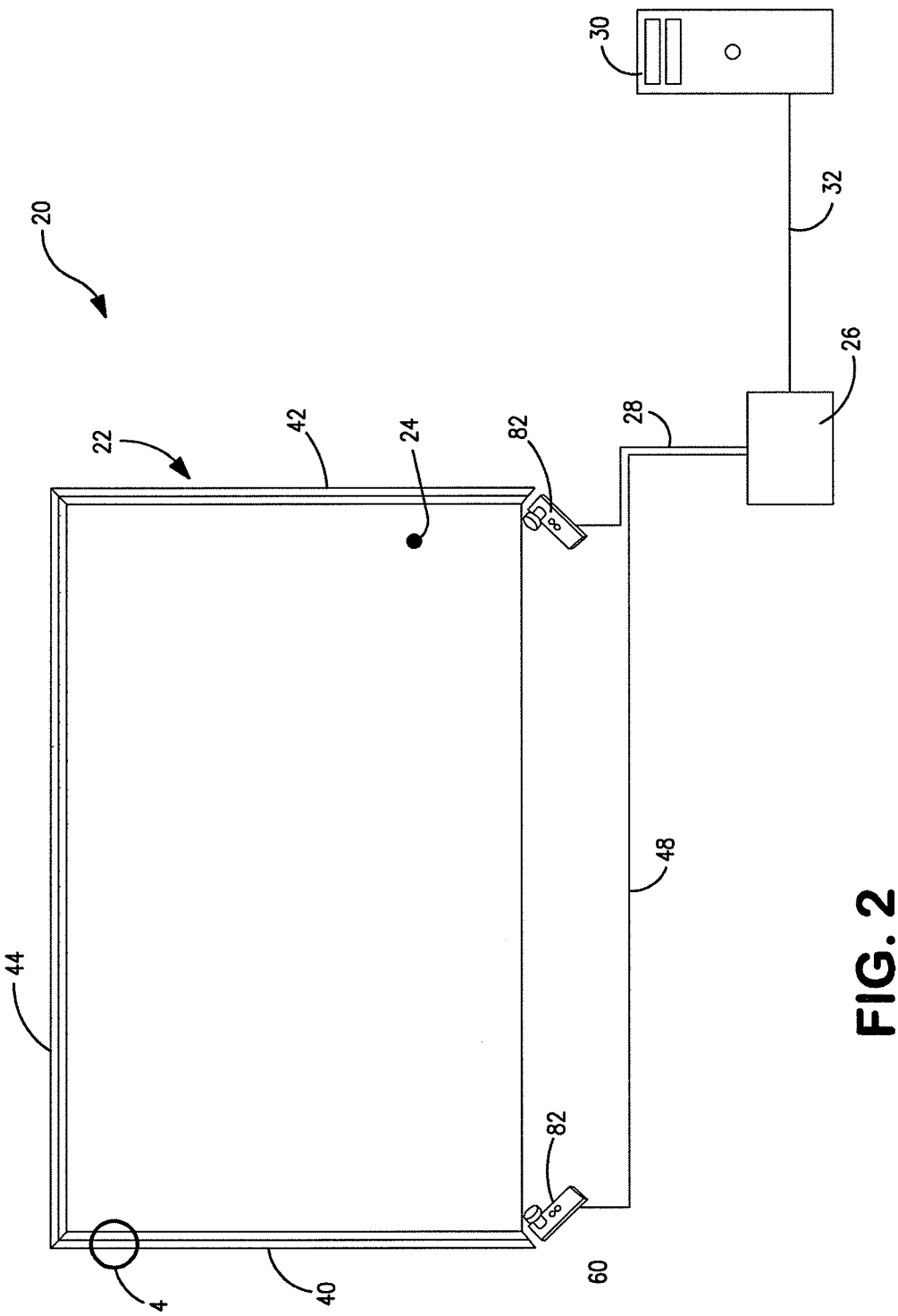
FIG. 2 is a block diagram view of the interactive input system of FIG. 1.

Turning now to FIGS. 1 and 2, an interactive input system that allows a user to input ink into an application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube etc. and surrounds the display surface 24 of the display unit. The assembly 22 employs machine vision to detect pointers brought into a region of interest in proximity with the display surface 24 and communicates with a digital signal processor (DSP) unit 26 via communication lines 28. The communication lines 28 may be embodied in a serial bus, a parallel bus, a universal serial bus (USB), an Ethernet connection or other suitable wired connection. The DSP unit 26 in turn communicates with a computer 30 executing one or more application programs via a USB cable 32. Alternatively, the DSP unit 26 may communicate with the computer 30 over another wired connection such as for example, a parallel bus, an RS-232 connection, an Ethernet connection etc. or may communicate with the computer 30 over a wireless connection using a suitable wireless protocol such as for example Bluetooth, WiFi, ZigBee, ANT, IEEE 802.15.4, Z-Wave etc. Computer 30 processes the output of the assembly 22 received via the DSP unit 26 and adjusts image data that is output to the display unit so that the image presented on the display surface 24 reflects pointer activity. In this manner, the assembly 22, DSP unit 26 and computer 30 form a closed loop allowing pointer activity proximate to the display surface 24 to be recorded as writing or drawing or used to control execution of one or more application programs executed by the computer 30.

Assembly 22 comprises a frame assembly that is mechanically attached to the display unit and surrounds the display surface 24. Frame assembly comprises a bezel having three bezel segments 40 to 44, four corner pieces 46 and a tool tray segment 48. Bezel segments 40 and 42 extend along opposite side edges of the display surface 24 while bezel segment 44 extends along the top edge of the display surface 24. The tool tray segment 48 extends along the bottom edge of the display surface 24 and supports one or more active pen tools P. The corner pieces 46 adjacent the top left and top right corners of the display surface 24 couple the bezel segments 40 and 42 to the bezel segment 44. The corner pieces 46 adjacent the bottom left and bottom right corners of the display surface 24 couple the bezel segments 40 and 42 to the tool tray segment 48. In this embodiment, the corner pieces 46 adjacent the bottom left and bottom right corners of the display surface 24 accommodate imaging assemblies 60 that look generally across the entire display surface 24 from different vantages. The bezel segments 40 to 44 are oriented so that their inwardly facing surfaces are seen by the imaging assemblies 60.

Figure 3:
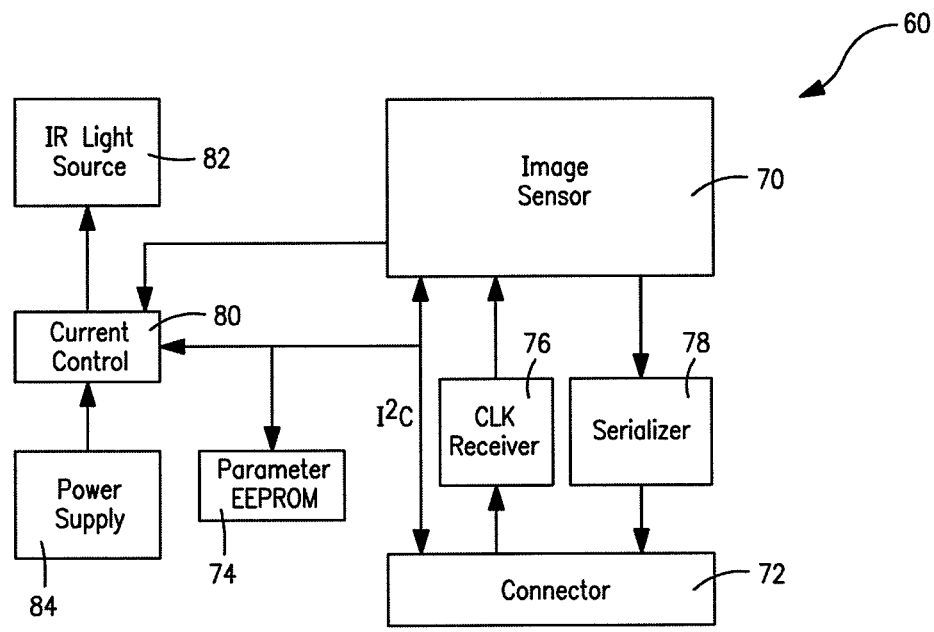
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Micron under model No. MT9V022 fitted with an 880 nm lens of the type manufactured by Boowon under model No. BW25B. The lens has an IR-pass/visible light blocking filter thereon (not shown) and provides the image sensor 70 with a 98 degree field of view so that the entire display surface 24 is seen by the image sensor 70. The image sensor 70 is connected to a connector 72 that receives one of the communication lines 28 via an I$^2$C serial bus. The image sensor 70 is also connected to an electrically erasable programmable read only memory (EEPROM) 74 that stores image sensor calibration parameters as well as to a clock (CLK) receiver 76, a serializer 78 and a current control module 80. The clock receiver 76 and the serializer 78 are also connected to the connector 72. Current control module 80 is also connected to an infrared (IR) light source 82 comprising a plurality of IR light emitting diodes (LEDs) and associated lens assemblies as well as to a power supply 84 and the connector 72. Of course, those of skill in the art will appreciate that other types of suitable radiation sources to provide illumination to the region of interest may be used.

The clock receiver 76 and serializer 78 employ low voltage, differential signaling (LVDS) to enable high speed communications with the DSP unit 26 over inexpensive cabling. The clock receiver 76 receives timing information from the DSP unit 26 and provides clock signals to the image sensor 70 that determines the rate at which the image sensor 70 captures and outputs image frames. Each image frame output by the image sensor 70 is serialized by the serializer 78 and output to the DSP unit 26 via the connector 72 and communication lines 28.

Figure 4:
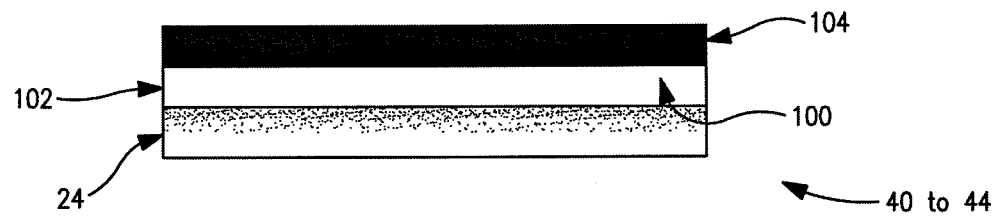
FIG. 4 is a front elevational view of a portion of a bezel segment forming part of the interactive input system of FIG. 1.

FIG. 4 shows a portion of the inwardly facing surface 100 of one of the bezel segments 40 to 44. As can be seen, the inwardly facing surface 100 is divided into a plurality of generally horizontal strips or bands, each band of which has a different optical property. In this embodiment, the inwardly facing surface 100 of the bezel segment is divided into two (2) bands 102 and 104. The band 102 nearest the display surface 24 is formed of a retro-reflective material and the band 104 furthest from the display surface 24 is formed of an infrared (IR) radiation absorbing material. To take best advantage of the properties of the retro-reflective material, the bezel segments 40 to 44 are oriented so that their inwardly facing surfaces extend in a plane generally normal to that of the display surface 24.

Figure 5:
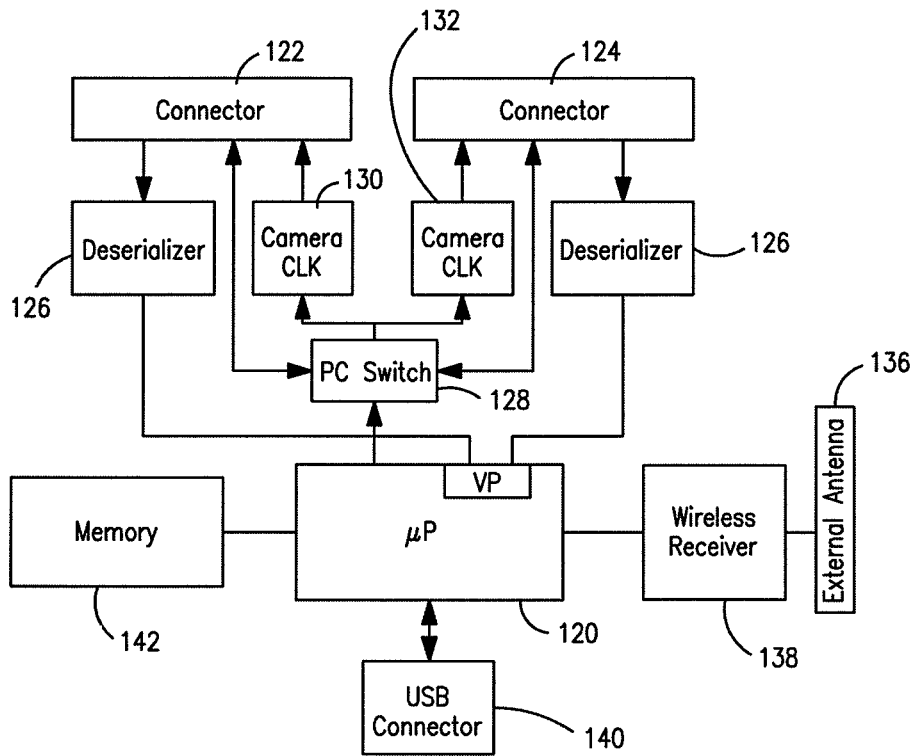
FIG. 5 is a block diagram of a digital signal processor forming part of the interactive input system of FIG. 1.
Figure 8:
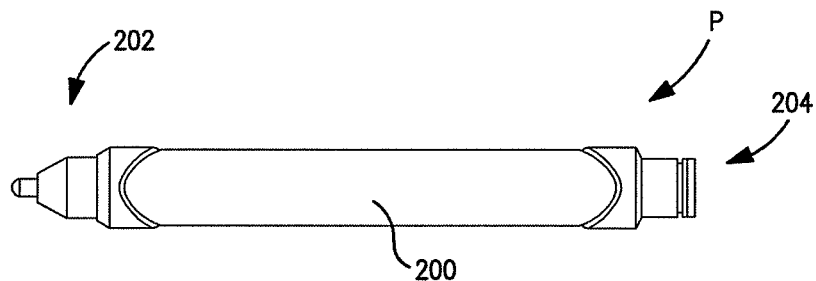
FIG. 8 is a side elevational view of a pen tool used in conjunction with the interactive input system of FIG. 1.

Turning now to FIG. 5, the DSP unit 26 is better illustrated. As can be seen, DSP unit 26 comprises a controller 120 such as for example, a microprocessor, microcontroller, DSP etc. having a video port VP connected to connectors 122 and 124 via deserializers 126. The controller 120 is also connected to each connector 122, 124 via an I$^2$C serial bus switch 128. I$^2$C serial bus switch 128 is connected to clocks 130 and 132, each clock of which is connected to a respective one of the connectors 122, 124. The controller 120 communicates with an external antenna 136 via a wireless receiver 138, a USB connector 140 that receives USB cable 32 and memory 142 including volatile and non-volatile memory. The clocks 130 and 132 and deserializers 126 similarly employ low voltage, differential signaling (LVDS).

The interactive input system 20 is able to detect passive pointers such as for example, a user's finger, a cylinder or other suitable object as well as active pen tools P that are brought into proximity with the display surface 24 and within the fields of view of the imaging assemblies 60. For ease of discussion, the operation of the interactive input system 20, when a passive pointer is brought into proximity with the display surface 24, will firstly be described.

During operation, the controller 120 conditions the clocks 130 and 132 to output clock signals that are conveyed to the imaging assemblies 60 via the communication lines 28. The clock receiver 76 of each imaging assembly 60 uses the clock signals to set the frame rate of the associated image sensor 70. In this embodiment, the controller 120 generates clock signals so that the frame rate of each image sensor 70 is twice the desired image frame output rate. The controller 120 also signals the current control module 80 of each imaging assembly 60 over the I$^2$C serial bus. In response, each current control module 80 connects the IR light source 82 to the power supply 84 and then disconnects the IR light source 82 from the power supply 84 so that each IR light source 82 turns on and off. The timing of the on/off IR light source switching is controlled so that for each pair of subsequent image frames captured by each image sensor 70, one image frame is captured when the IR light source 82 is on and one image frame is captured when the IR light source 82 is off.

Figure 6A:
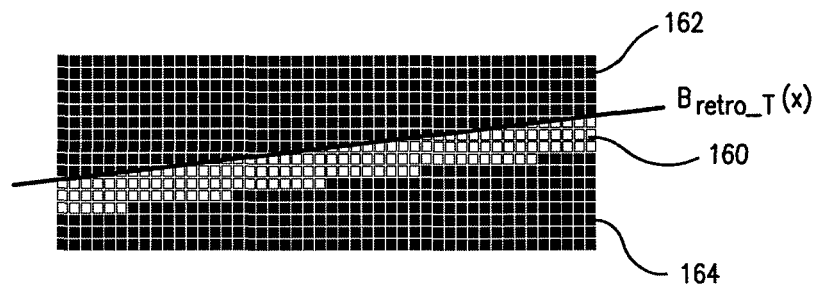
FIGS. 6a to 6c are image frames captured by the imaging assembly of FIG. 3.
Figure 6B:
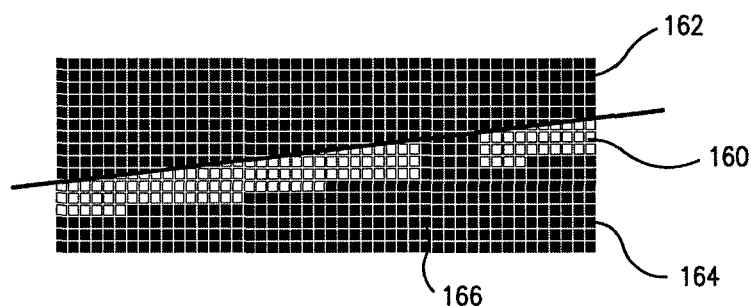

When the IR light sources 82 are on, the LEDs of the IR light sources flood the region of interest over the display surface 24 with infrared illumination. Infrared illumination that impinges on the IR radiation absorbing bands 104 of the bezel segments 40 to 44 is not returned to the imaging assemblies 60. Infrared illumination that impinges on the retro-reflective bands 102 of the bezel segments 40 to 44 is returned to the imaging assemblies 60. The configuration of the LEDs of each IR light source 82 is selected so that the retro-reflective bands 102 are generally evenly illuminated over their entire lengths. Further specifics concerning the IR light sources 82 are described in U.S. patent application Ser. No. 12/118,552 to Hansen et al. entitled "Interactive Input System And Illumination Assembly Therefor" filed concurrently herewith and assigned to SMART Technologies ULC of Calgary, Alberta, the content of which is incorporated herein by reference. As a result, in the absence of a pointer, the image sensor 70 of each imaging assembly 60 sees a bright band 160 having a substantially even intensity over its length disposed between an upper dark band 162 corresponding to the IR radiation absorbing bands 104 and a lower dark band 164 corresponding to the display surface 24 as shown in FIG. 6a. When a pointer is brought into proximity with the display surface 24 and is sufficiently distant from the IR light sources 82, the pointer occludes infrared illumination reflected by the retro-reflective bands 102. As a result, the pointer appears as a dark region 166 that interrupts the bright band 160 in captured image frames as shown in FIG. 6b.

Figure 6C:
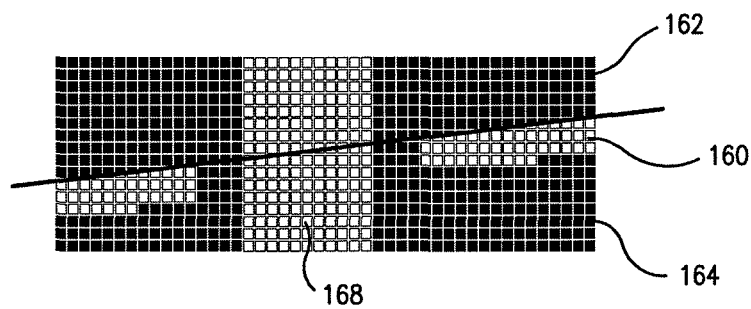

As mentioned above, each image frame output by the image sensor 70 of each imaging assembly 60 is conveyed to the DSP unit 26. When the DSP unit 26 receives image frames from the imaging assemblies 60, the controller 120 processes the image frames to detect the existence of a pointer therein and if a pointer exists, to determine the position of the pointer relative to the display surface 24 using triangulation. To reduce the effects unwanted light may have on pointer discrimination, the controller 120 measures the discontinuity of light within the image frames rather than the intensity of light within the image frames to detect the existence of a pointer. There are generally three sources of unwanted light, namely ambient light, light from the display unit and infrared illumination that is emitted by the IR light sources 82 and scattered off of objects proximate to the imaging assemblies 60. As will be appreciated, if a pointer is close to an imaging assembly 60, infrared illumination emitted by the associated IR light source 82 may illuminate the pointer directly resulting in the pointer being as bright as or brighter than the retro-reflective bands 102 in captured image frames. As a result, the pointer will not appear in the image frames as a dark region interrupting the bright band 160 but rather will appear as a bright region 168 that extends across the bright band 160 and the upper and lower dark bands 162 and 164 as shown in FIG. 6c.

The controller 120 processes successive image frames output by the image sensor 70 of each imaging assembly 60 in pairs. In particular, when one image frame is received, the controller 120 stores the image frame in a buffer. When the successive image frame is received, the controller 120 similarly stores the image frame in a buffer. With the successive image frames available, the controller 120 subtracts the two image frames to form a difference image frame. Provided the frame rates of the image sensors 70 are high enough, ambient light levels in successive image frames will typically not change significantly and as a result, ambient light is substantially cancelled out and does not appear in the difference image frame.

Once the difference image frame has been generated, the controller 120 processes the difference image frame and generates discontinuity values that represent the likelihood that a pointer exists in the difference image frame. When no pointer is in proximity with the display surface 24, the discontinuity values are high. When a pointer is in proximity with the display surface 24, some of the discontinuity values fall below a threshold value allowing the existence of the pointer in the difference image frame to be readily determined.

In order to generate the discontinuity values for each difference image frame, the controller 120 calculates a vertical intensity profile (VIP$_{retro}$) for each pixel column of the difference image frame between bezel lines $B_{retro\_T}(x)$ and $B_{retro\_B}(x)$ that generally represent the top and bottom edges of the bright band 160 in the difference image and calculates a VIP$_{dark}$ for each pixel column of the difference image frame between bezel lines $B_{dark\_T}(x)$ and $B_{dark\_B}(x)$ that generally represent the top and bottom edges of the upper dark band 162 in the difference image. The bezel lines are determined via a bezel finding procedure performed during calibration at interactive input system start up, as will be described.

The VIP$_{retro}$ for each pixel column is calculated by summing the intensity values I of N pixels in that pixel column between the bezel lines $B_{retro\_T}(x)$ and $B_{retro\_B}(x)$. The value of N is determined to be the number of pixel rows between the bezel lines $B_{retro\_T}(x)$ and $B_{retro\_B}(x)$, which is equal to the width of the retro-reflective bands 102. If any of the bezel lines falls partway across a pixel of the difference image frame, then the intensity level contribution from that pixel is weighted proportionally to the amount of the pixel that falls inside the bezel lines $B_{retro\_T}(x)$ and $B_{retro\_B}(x)$. During VIP$_{retro}$ calculation for each pixel column, the location of the bezel lines $B_{retro\_T}(x)$ and $B_{retro\_B}(x)$ within that pixel column are broken down into integer components $B_{i\_retro\_T}(x)$, $B_{i\_retro\_B}(x)$, and fractional components $B_{f\_retro\_T}(x)$ and $B_{i\_retro\_B}(x)$ represented by:

$$B_{i\_retro\_T}(x)=\text{ceil}[B_{retro\_T}(x)]$$

$$B_{i\_retro\_B}(x)=\text{floor}[B_{retro\_B}(x)]$$

$$B_{f\_retro\_T}(x)=B_{i\_retro\_T}(x)-B_{retro\_T}(x)$$

$$B_{f\_retro\_B}(x)=B_{retro\_B}(x,y)-B_{i\_retro\_B}(x)$$

The VIP$_{retro}$ for the pixel column is then calculated by summing the intensity values I of the N pixels along the pixel column that are between the bezel lines $B_{retro\_T}(x)$ and $B_{retro\_B}(x)$ with the appropriate weighting at the edges according to: VIP$_{retro}(x)=(B_{f\_retro\_T}(x)I(x, B_{i\_retro\_T}(x)-1)+(B_{f\_retro\_B}(x)I(x, B_{i\_retro\_B}(x))+\text{sum}(I(x, B_{i\_retro\_T}+j)$ where $N=(B_{i\_retro\_B}(x)-B_{i\_retro\_T}(x))$, j is in the range of 0 to N and I is the intensity at location x between the bezel lines.

The VIP$_{dark}$ for each pixel column is calculated by summing the intensity values I of K pixels in that pixel column between the bezel lines $B_{dark\_T}(x)$ and $B_{dark\_B}(x)$. The value of K is determined to be the number of pixel rows between the bezel lines $B_{dark\_T}(x)$ and $B_{dark\_B}(x)$, which is equal to the width of the IR radiation absorbing bands 104. If any of the bezel lines falls partway across a pixel of the difference image frame, then the intensity level contribution from that pixel is weighted proportionally to the amount of the pixel that falls inside the bezel lines $B_{dark\_T}(x)$ and $B_{dark\_B}(x)$. During VIP$_{dark}$ calculation for each pixel column, the location of the bezel lines $B_{dark\_T}(x)$ and $B_{dark\_B}(x)$ within that pixel column are broken down into integer components $B_{i\_dark\_T}(x)$, $B_{i\_dark\_B}(x)$, and fractional components $B_{f\_dark\_T}(x)$ and $B_{i\_dark\_B}(x)$ represented by:

$$B_{i\_dark\_T}(x)=\text{ceil}[B_{dark\_T}(x)]$$

$$B_{i\_dark\_B}(x)=\text{floor}[B_{dark\_B}(x)]$$

$$B_{f\_dark\_T}(x)=B_{i\_dark\_T}(x)-B_{dark\_T}(x)$$

$$B_{f\_dark\_B}(x)=B_{dark\_B}(x,y)-B_{i\_dark\_B}(x)$$

The VIP$_{dark}$ for each pixel column is calculated in a similar manner by summing the intensity values I of the K pixels along the pixel column that are between the bezel lines $B_{dark\_T}(x)$ and $B_{dark\_B}(x)$ with the appropriate weighting at the edges according to:

$$\text{VIP}_{dark}(x)=(B_{f\_dark\_T}(x)I(x, B_{i\_dark\_T}(x)-1)+(B_{f\_dark\_B}(x)I(x, B_{i\_dark\_B}(x))+\text{sum}(I(x, B_{i\_dark\_T}+j)$$

where $K=(B_{i\_dark\_B}(x)-B_{i\_dark\_T}(x))$ and j is in the range of 0 to N.

The VIPs are subsequently normalized by dividing them by the corresponding number of pixel rows (N for the retro-reflective regions, and K for the dark regions). The discontinuity value D(x) for each pixel column is then calculated by determining the difference between VIP$_{retro}$ and VIP$_{dark}$ according to:

$$D(x)=\text{VIP}_{retro}(x)-\text{VIP}_{dark}(x)$$

Figure 7A:
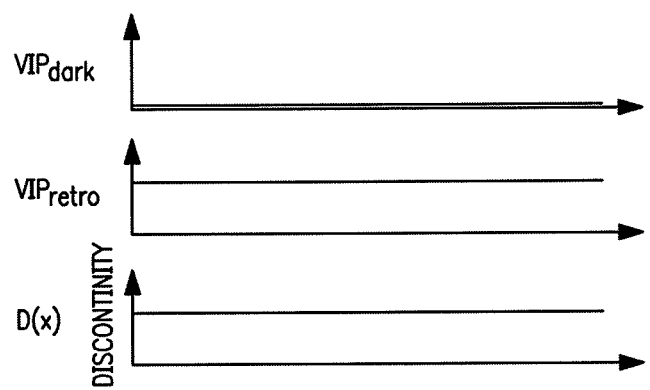
FIGS. 7a to 7c show plots of normalized $VIP_{dark}$, $VIP_{retro}$ and $D(x)$ values calculated for the pixel columns of the image frames of FIGS. 6a to 6c.
Figure 7B:
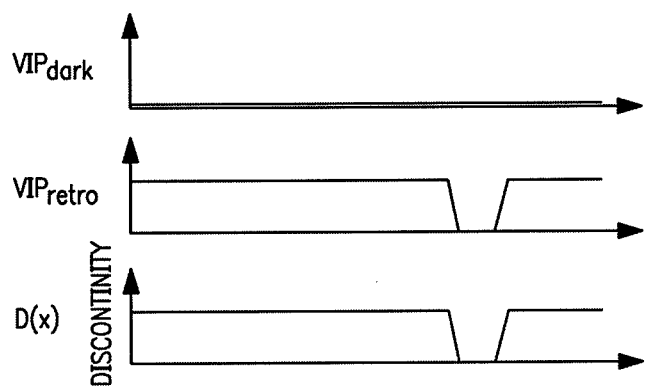
Figure 7C:
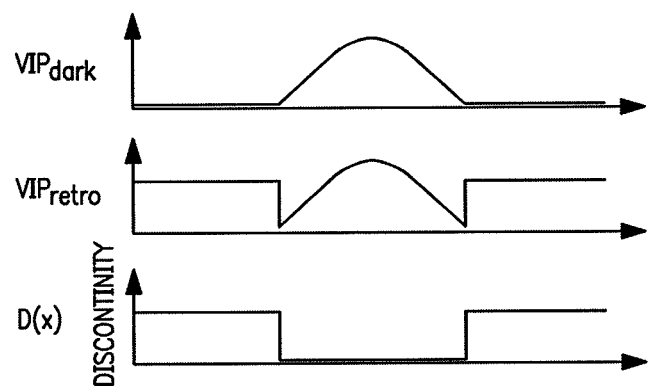
Figure 9:
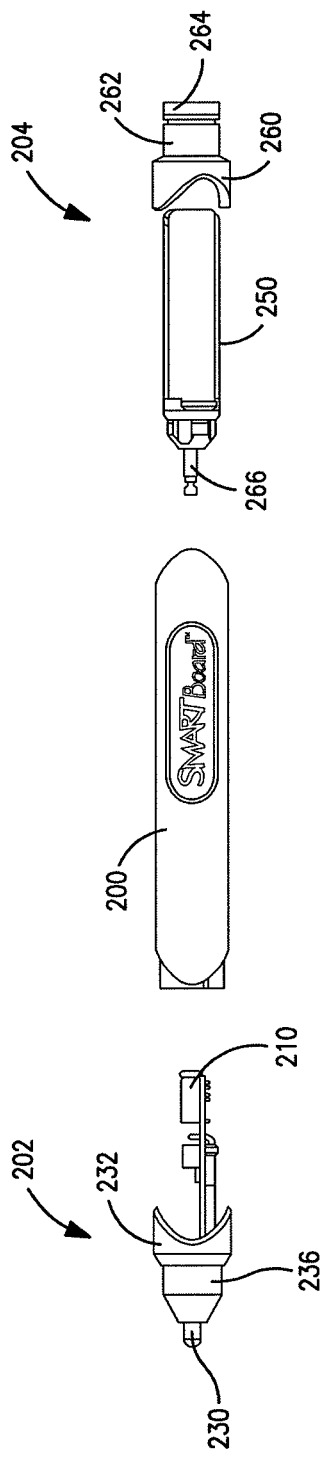
FIG. 9 is partially exploded, side elevational view of the pen tool of FIG. 8.
Figure 10:
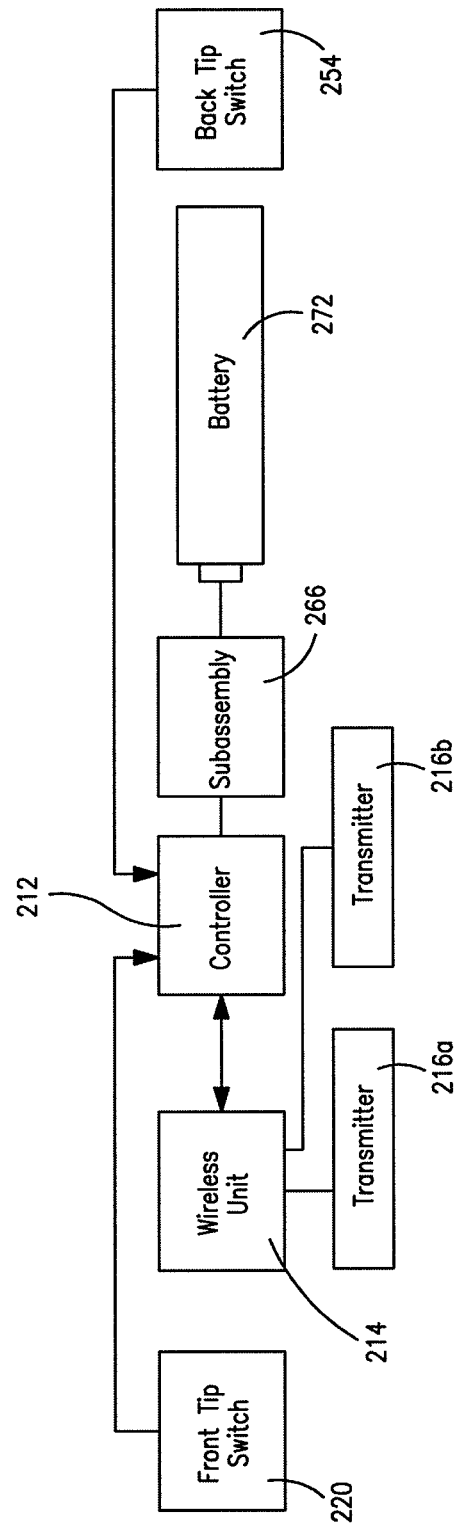
FIG. 10 is a block diagram of the pen tool of FIG. 8.
Figure 11:
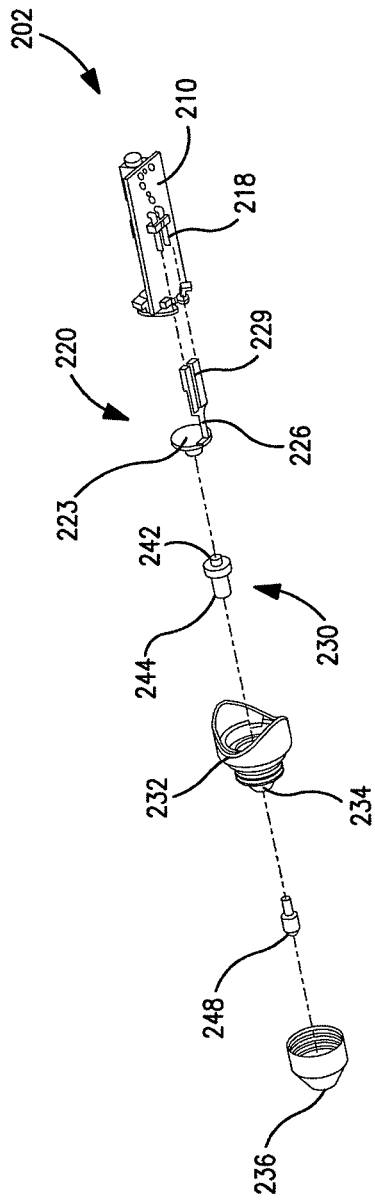
FIG. 11 is an exploded perspective view of a tip assembly forming part of the pen tool of FIG. 8.
Figure 14:
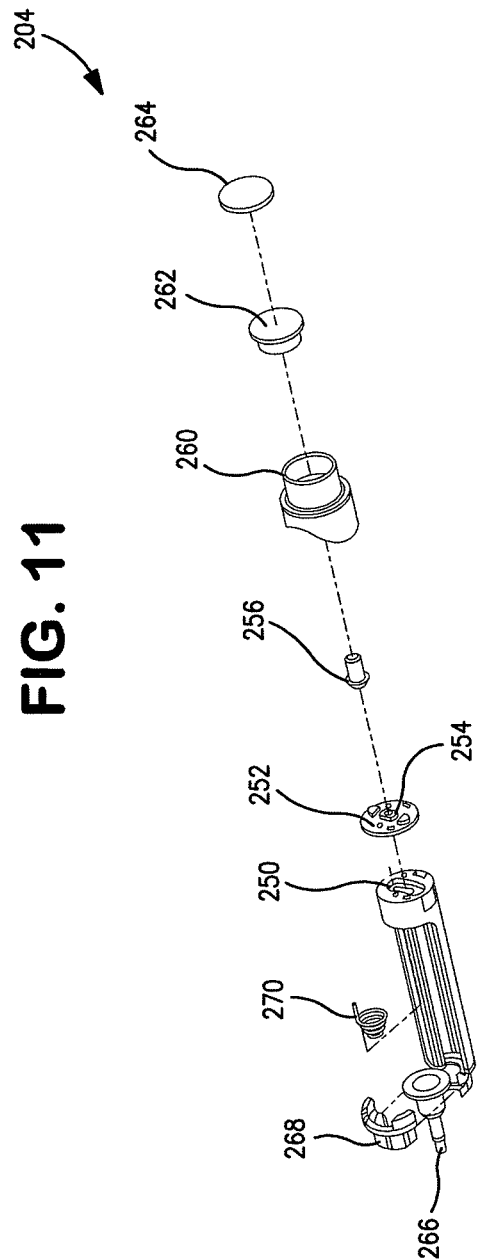
FIG. 14 is an exploded perspective view of an eraser assembly forming part of the pen tool of FIG. 8.
Figure 12:
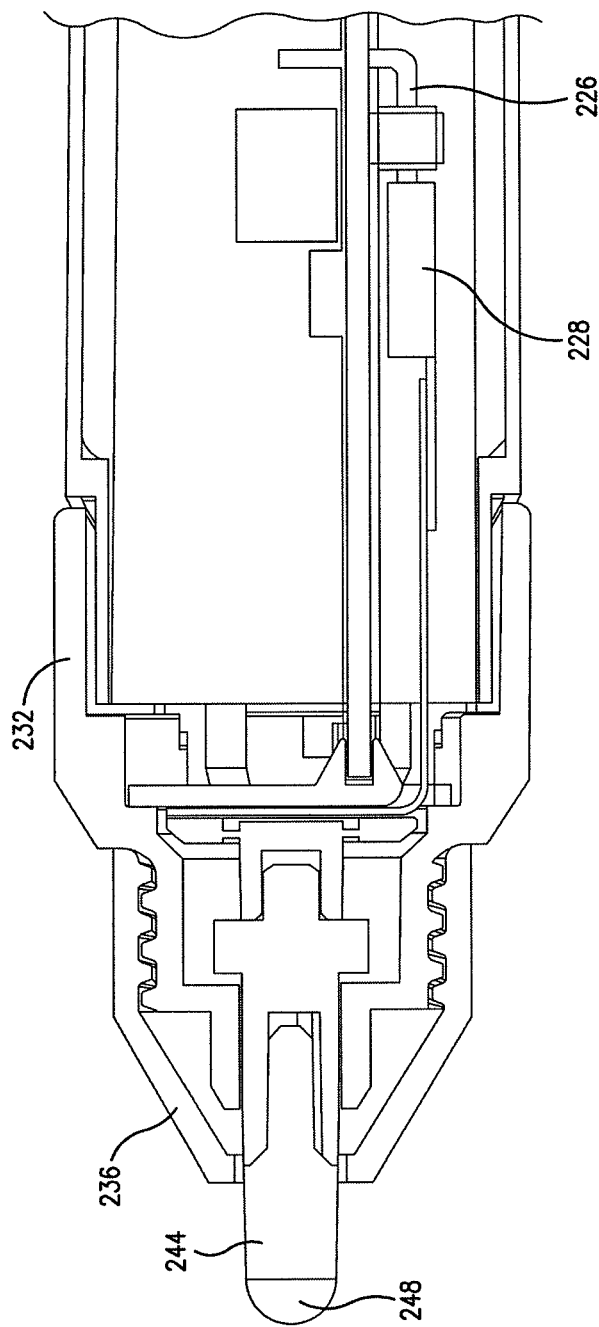
FIG. 12 is a cross-sectional view of the tip assembly of FIG. 11.
Figure 13:
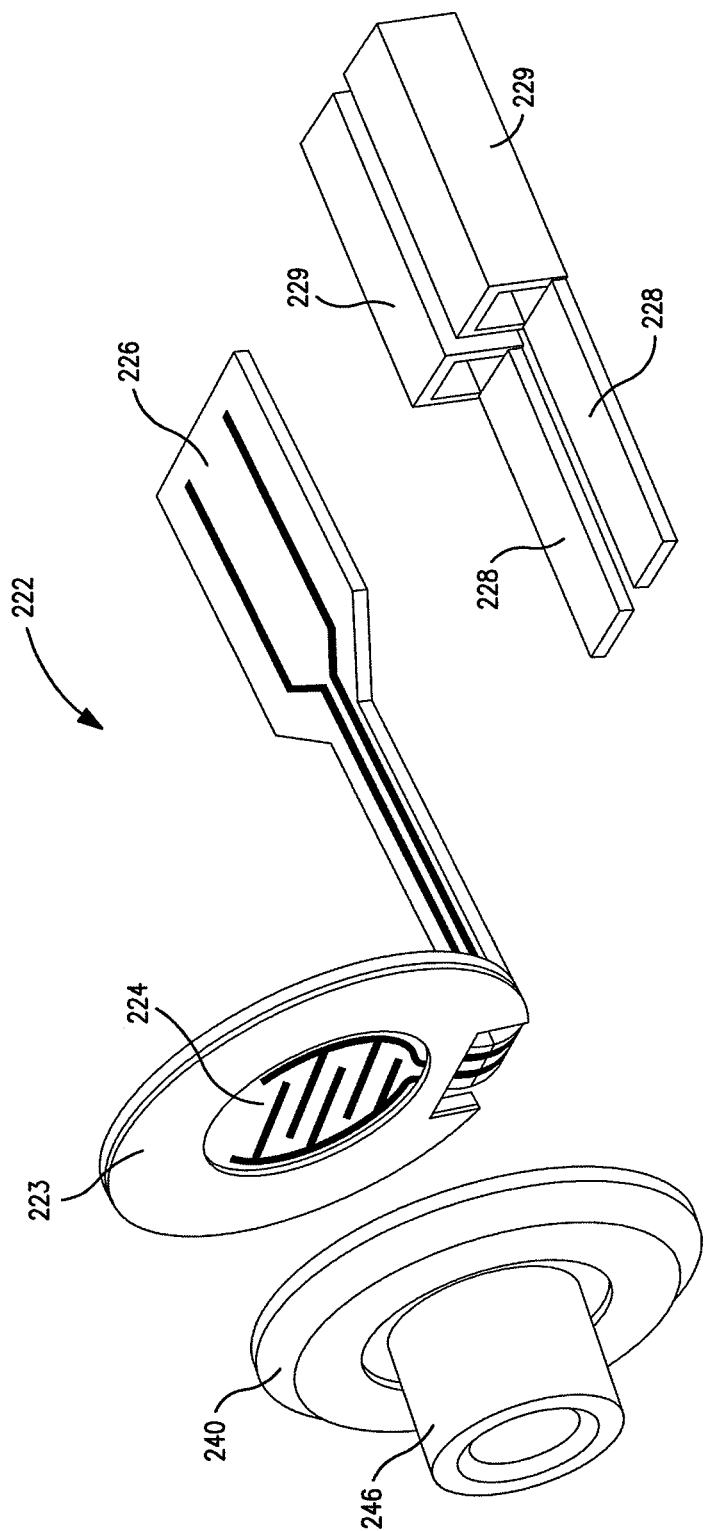
FIG. 13 is an exploded perspective view of a tip switch assembly forming part of the tip assembly of FIG. 12.

FIG. 7a shows plots of the normalized VIP$_{dark}$, VIP$_{retro}$ and D(x) values calculated for the pixel columns of the image frame of FIG. 6a. As will be appreciated, in this image frame no pointer exists and thus, the discontinuity values D(x) remain high for all of the pixel columns of the image frame. FIG. 7b shows plots of the normalized VIP$_{dark}$, VIP$_{retro}$ and D(x) values calculated for the pixel columns of the image frame of FIG. 6b. As can be seen, the D(x) curve drops to low values at a region corresponding to the location of the pointer in the image frame. FIG. 7c shows plots of the normalized VIP$_{dark}$, VIP$_{retro}$ and D(x) values calculated for the pixel columns of the image frame of FIG. 6c. As can be seen, the D(x) curve also drops to low values at a region corresponding to the location of the pointer in the image frame.

Once the discontinuity values D(x) for the pixel columns of each difference image frame have been determined, the resultant D(x) curve for each difference image frame is examined to determine if the D(x) curve falls below a threshold value signifying the existence of a pointer and if so, to detect left and right edges in the D(x) curve that represent opposite sides of a pointer. In particular, in order to locate left and right edges in each difference image frame, the first derivative of the D(x) curve is computed to form a gradient curve $\nabla D(x)$. If the D(x) curve drops below the threshold value signifying the existence of a pointer, the resultant gradient curve $\nabla D(x)$ will include a region bounded by a negative peak and a positive peak representing the edges formed by the dip in the D(x) curve. In order to detect the peaks and hence the boundaries of the region, the gradient curve $\nabla D(x)$ is subjected to an edge detector.

In particular, a threshold T is first applied to the gradient curve $\nabla D(x)$ so that, for each position x, if the absolute value of the gradient curve $\nabla D(x)$ is less than the threshold, that value of the gradient curve $\nabla D(x)$ is set to zero as expressed by:

$$\nabla D(x)=0, \text{ if } |\nabla D(x)|<T$$

Following the thresholding procedure, the thresholded gradient curve $\nabla D(x)$ contains a negative spike and a positive spike corresponding to the left edge and the right edge representing the opposite sides of the pointer, and is zero elsewhere. The left and right edges, respectively, are then detected from the two non-zero spikes of the thresholded gradient curve $\nabla D(x)$. To calculate the left edge, the centroid distance $CD_{left}$ is calculated from the left spike of the thresholded gradient curve $\nabla D(x)$ starting from the pixel column $X_{left}$ according to:

$$CD_{left} = \frac{\sum_i (x_i - X_{left})\nabla D(x_i)}{\sum_i \nabla D(x_i)}$$

where $x_i$ is the pixel column number of the i-th pixel column in the left spike of the gradient curve $\nabla D(x)$, i is iterated from 1 to the width of the left spike of the thresholded gradient curve $\nabla D(x)$ and $X_{left}$ is the pixel column associated with a value along the gradient curve $\nabla D(x)$ whose value differs from zero (0) by a threshold value determined empirically based on system noise. The left edge in the thresholded gradient curve $\nabla D(x)$ is then determined to be equal to $X_{left}$+$CD_{left}$.

To calculate the right edge, the centroid distance $CD_{right}$ is calculated from the right spike of the thresholded gradient curve $\nabla D(x)$ starting from the pixel column $X_{right}$ according to:

$$CD_{right} = \frac{\sum_j (x_i - X_{right})\nabla D(x_j)}{\sum_j \nabla D(x_j)}$$

where $x_j$ is the pixel column number of the j-th pixel column in the right spike of the thresholded gradient curve $\nabla D(x)$, j is iterated from 1 to the width of the right spike of the thresholded gradient curve $\nabla V D(x)$ and $X_{right}$ is the pixel column associated with a value along the gradient curve $\nabla D(x)$ whose value differs from zero (0) by a threshold value determined empirically based on system noise. The right edge in the thresholded gradient curve is then determined to be equal to $X_{right}$+$CD_{right}$.

Once the left and right edges of the thresholded gradient curve $\nabla D(x)$ are calculated, the midpoint between the identified left and right edges is then calculated thereby to determine the location of the pointer in the difference image frame.

After the location of the pointer in each difference frame has been determined, the controller 120 uses the pointer positions in the difference image frames to calculate the position of the pointer in (x,y) coordinates relative to the display surface 24 using triangulation in a manner similar to that described in above incorporated U.S. Pat. No. 6,803,906 to Morrison et al. The calculated pointer coordinate is then conveyed by the controller 120 to the computer 30 via the USB cable 32. The computer 30 in turn processes the received pointer coordinate and updates the image output provided to the display unit, if required, so that the image presented on the display surface 24 reflects the pointer activity. In this manner, pointer interaction with the display surface 24 can be recorded as writing or drawing or used to control execution of one or more application programs running on the computer 30.

During the bezel finding procedure performed at interactive input system start up, a calibration procedure is performed for each image sensor to determine the bezel lines $B_{retro\_T}(x)$, $B_{retro\_B}(x)$, $B_{dark\_T}(x)$ and $B_{dark\_B}(x)$. During each calibration procedure, a calibration image pair is captured by the associated image sensor 70. One calibration image of the pair is captured while the IR light source 82 associated with the image sensor is on and the other calibration image of the pair is captured while the IR light source 82 associated with the image sensor is off. The two calibration images are then subtracted to form a calibration difference image thereby to remove ambient lighting artifacts. The pixel rows of interest of the calibration difference image (i.e. the pixel rows forming the bright band 160 representing the retro-reflective bands 102) are then determined.

During this process, the sum of pixel values for each pixel row of the calibration difference image is calculated to generate a horizontal intensity profile for the calibration difference image. A gradient filter is then applied to the horizontal intensity profile. The gradient filter takes the absolute value of the second derivative of the horizontal intensity profile and applies a sixteen (16) point Gaussian filter to smooth the result. Each region of data having values greater than fifty percent (50%) of the peak value is then examined to detect the region having the largest area. The midpoint of that region is then designated as the center pixel row. The first and last eighty (80) pixel rows of the horizontal intensity profile are not used during this process to reduce the impact of lighting artifacts and external infrared light sources.

Each pixel column of the calibration difference image is then processed to determine the pixels therein corresponding to the bright band 160. Initially, the locations of the image sensors 70 are not known and so an arbitrary processing direction is selected. In this embodiment, the pixel columns of the calibration difference image are processed from left to right. During processing of each pixel column, a small slice of the pixel data for the pixel column is taken based on the location of the center pixel row. In this embodiment, the slice comprises one hundred pixel rows centered on the center pixel row. Each image slice is cross-correlated with a Gaussian model used to approximate the retro-reflective bands 102 in intensity and width. The results of the cross-correlation identify the bright band 160 of the calibration difference image that represents the retro-reflective bands 102 of the bezel. This correlation is multiplied with the calibration image that was captured with the IR light source 82 on to highlight further the bright band 160 and reduce noise.

Afterwards, for each pixel column, a peak-search algorithm is then applied to the resulting pixel column data to locate peaks. If one peak is found, it is assumed that no differentiation between the retro-reflective bands 102 of the bezel and its reflection in the display surface 24 is possible in the pixel column. If two peaks are found, it is assumed that the retro-reflective bands of the bezel and their reflections in the display surface 24 are visible in the pixel column and can be differentiated. For each pixel column where two peaks are found, the width of the bright band 160 representing the retro-reflection bands and the band representing the reflection of the retro-reflective bands 102 in the display surface 24 are determined by finding the rising and falling edges surrounding the detected peaks. With the width of the bright band 160 in the pixel columns known, the bezel lines $B_{retro\_T}(x)$ and $B_{retro\_B}(x)$ can be estimated. From the width of the bright band 160, the upper dark band 162 is determined to be directly above the bright band 160 and to have a width general equal to that of the bright band. As bezel line $B_{dark\_B}(x)$ is coincident with bezel line $B_{retro\_T}(x)$, the bezel line $B_{dark\_T}(x)$ can also be estimated.

The start and end pixel columns of the bezel are then determined by looking at the intensity of the pixel column data for the first one hundred and fifty (150) and last first one hundred and fifty (150) pixel columns. The inner-most pixel column in the first one-hundred and fifty pixel columns that has a value lower than a threshold value is determined to be the start of the bezel and the inner-most pixel column in the last one-hundred and fifty pixel columns that has a value lower than the threshold value is determined to be the end of the bezel.

After the start and end points of the bezel have been found, a continuity check is performed to confirm that the pixels of the bright band 160 are close to each other from pixel column to pixel column. During this check, the pixels of the bright band 160 in adjacent pixel columns are compared to determine if the distance therebetween is beyond a threshold distance signifying a spike. For each detected spike, pixels of the bright band 160 on opposite sides of the spike region are interpolated and the interpolated values are used to replace the pixels of the spike. This process patches gaps in the bright band 160 caused by image sensor overexposure or bezel occlusion as well as to smooth out any misidentified bezel points.

The width of the bright band 160 at the left side and the right side of the resulting image is then examined. The side of the resulting image associated with the smallest bright band width is deemed to represent the portion of the bezel that is furthest from the image sensor 70. The procedure to determine the pixels of the bright band in each pixel column and continuity check discussed above are then re-performed. During this second pass, the direction the image data is processed is based on the location of the image sensor 70 relative to the bezel. The image data representing the portion of the bezel that is closest to the image sensor 70 is processed first. As a result, during the second pass, the pixel columns of the resulting image are processed from left to right for the image sensor 70 at the bottom left corner of the display surface 24 and from right to left for the image sensor 70 at the bottom right corner of the display surface 24 in the manner described above. During this second pass, the peak-search algorithm focuses around the pixel column data corresponding to the estimated bezel lines $B_{retro\_T}(x)$ and $B_{retro\_B}(x)$.

Turning now to FIGS. 8 to 14, one of the pen tools P for use in conjunction with the interactive input system 20 is shown and is generally identified by reference numeral 200. As can be seen, the pen tool P comprises a hollow body 200 formed by interconnected half shells that accommodates a tip assembly 202 at one end and an eraser assembly 204 at its other end. The tip assembly 202 comprises a printed circuit board 210 on which a controller 212 is mounted. The controller 212 communicates with a wireless unit 214 that broadcasts signals via wireless transmitters 216a and 216b such as for example, radio frequency (RF) antennae or IR LEDs. Tip switch contacts 218 are also mounted on the printed circuit board 210. A tip switch assembly 220 is mounted on the printed circuit board 210.

The tip switch assembly 220 comprises a polyester flex circuit 222 having a circular portion 223 that accommodates a contact circuit area 224. A contact lead 226 extends from the contact circuit area 224 and undergoes a ninety-degree turn relative to the plane of the circular portion 223. Leads 228 are attached to the contact lead 226 and terminate at crimp connectors 229. The crimp connectors 229 receive the tip switch contacts 218 thereby to connect electrically the tip switch assembly 220 to the controller 212. A plunger assembly 230 is aligned with the flex circuit 222. The plunger assembly 230 passes through a cap 232 that fits over the end of the body 200. The cap 232 has an externally threaded nose 234 that receives an internally threaded cone 236. The plunger assembly 230 extends through a hole in the cone 236 to define a writing tip for the pen tool P.

The plunger assembly 230 comprises a flexible cup 240 formed of silicone. The surface of the cup 240 that faces the flex circuit 222 has a conductive pad thereon 242. The conductive pad 242 is aligned with the contact circuit area 224. A generally cylindrical shaft 244 is received by a cylindrical tube 246 extending from the cup 240. The distal end of the shaft 244 has a nib 248 formed thereon.

The eraser assembly 204 comprises a battery carrier 250 having positive and negative leads. A printed circuit board 252 carrying a switch 254 that is electrically connected to the controller 212 is secured to one end of the battery carrier 250. A plunger 256 is aligned with the switch 254 and passes through a holder 260 that surrounds the printed circuit board 252 and one end of the battery carrier 250 and that fits over the end of the body 200. A cap 262 having a felt-like pad 264 thereon is received by the holder 260. A commercially available electrical subassembly 266 extends from the other end of the battery carrier 250 to the printed circuit board 210 and is retained by a half shell 268 that engages the end of the battery carrier 250. A spring 270 is accommodated by the battery carrier 250 to retain a battery 272 placed therein. The electrical subassembly 266 connects the battery 272 to the printed circuit boards 252 and 210 and provides a communication channel between the printed circuit boards.

When the pen tool P is brought into proximity with the display surface 24, its location relative to the display surface in (x,y) coordinates is calculated in the same manner as described above with reference to the passive pointer. However, depending on the manner in which the pen tool P is brought into contact with the display surface 24, the pen tool P may provide mode information that is used to interpret pen tool activity relative to the display surface 24. In particular, when the nib 248 of the pen tool P is brought into contact with the display surface 24 with sufficient force, the shaft 244 of the plunger assembly 230 moves inwardly into the body 200. This inward movement of the shaft 244 causes the cup 240 to flex thereby bringing the conductive pad 242 on the cup into contact the contact circuit area 224 of the flex circuit 222 resulting in closing of the tip switch assembly 220. Closing of the tip switch assembly 220 is sensed by the controller 212 and causes the controller 212 to condition the wireless unit 214 to output a modulated signal that is broadcast via the wireless transmitter 216a. The wireless transmitter 216a is positioned so that the modulated signal is emitter from the pen tool P slight aft of its tip.

The design of the plunger assembly 230 provides advantages in that a low activation force is required to move the shaft 244 of the plunger assembly 230 to close the tip switch assembly 220. Also, the shaft 244 of the plunger assembly 230 is not required to travel significantly into the body 200 to close the tip switch assembly 220. In particular, only about a 30 g activation force and a shaft travel equal to approximately 0.1 mm is required in order for the tip switch assembly 220 to close. The factors give the pen tool P a much more compliant writing feel with significantly less noise as compared to prior art pen tools. Also, the configuration of the flex circuit 222 gives the tip switch assembly 220 a slim profile so that the tip switch assembly has no appreciable impact on the diameter of the pen tool P.

When the cap 262 of the pen tool P is brought into contact with the display surface 24 with sufficient force, the cap 262 moves into the holder 260 thereby causing the plunger 256 to close the switch 254. Closing of the switch 254 is sensed by the controller 212 resulting in the controller 212 conditioning the wireless unit 214 to output a differently modulated signal that is broadcast via the wireless transmitter 216b. Similarly, the wireless transmitter 216b is positioned so that the modulated signal is emitter from the pen tool P slight aft of its eraser end.

The DSP unit 26 stores a modulated signal-to-pen tool mode mapping table in the memory 142. As a result, when a broadcast modulated signal is received by the controller 120 of the DSP unit 26 via the antenna 136, the controller 120 compares the received modulated signal to the mapping table to determine the pen tool mode. The controller 120 in turn uses this information to assign mode information to the generated pointer coordinates and conveys the mode information along with the pointer coordinates to the computer 30 so that the pointer coordinates are processed by the computer 30 in the desired manner. In this embodiment, when the nib 248 is in contact with the display surface 24 and the tip switch assembly 220 is closed, the pen tool P is deemed to be operating in an ink mode. Ink mode information is assigned to pointer coordinates generated by the controller 120 while the pen tool P is in this mode so that the computer 30 treats the pointer coordinates as writing or drawing (i.e. ink) on the display surface 24. When the cap 262 is in contact with the display surface 24 and the switch 254 is closed, the pen tool P is deemed to be operating in an eraser mode. Eraser mode information is assigned to pointer coordinates generated by the controller 120 while the pen tool is in this mode so that the computer 30 erases displayed ink at locations corresponding to the pointer coordinates. When no modulated signal is output by the pen tool P, the pen tool is deemed to be operating in a pointer mode and is treated in the same manner as a passive pointer. Pointer mode information is assigned to pointer coordinates generated by the controller 120 while the pen tool is in this mode so that the computer 30 treats the pointer coordinates as mouse events.

If desired, the IR light sources 82 can be modulated as described in U.S. patent application Ser. No. 12/118,521 to McReynolds et al. entitled "Interactive Input System with Controlled Lighting" filed concurrently herewith and assigned to SMART Technologies ULC of Calgary, Alberta, the content of which is incorporated by reference. In this manner, image frames for each imaging assembly based only on the contribution of illumination from its associated IR light source can be generated. The modulated signals output by the pen tool P can also be modulated.

Figure 15:
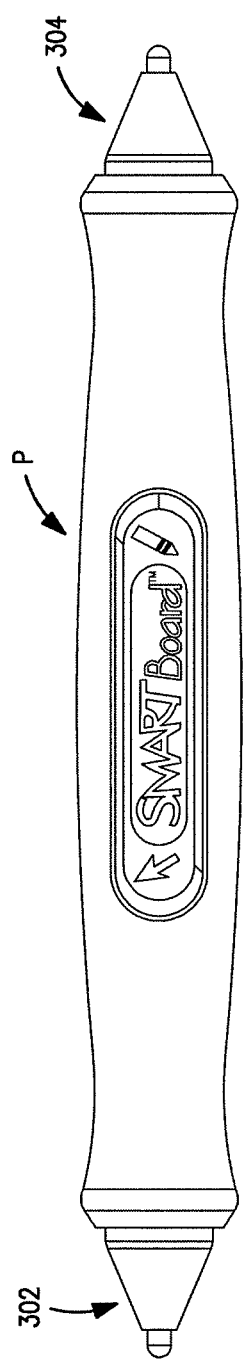
FIG. 15 is a side elevational view of an alternative pen tool for use in conjunction with the interactive input system of FIG. 1.

While FIGS. 8 to 14 show an exemplary pen tool, those of skill in the art will appreciate that pen tools P of different configurations can be used in conjunction with the interactive input system 20. For example, FIG. 15 shows an alternative pen tool P wherein tip assemblies 302 and 304 having similar physical geometries are provided at opposite ends of the pen tool body 306. In this case, the modulated signal output by the pen tool P differs depending on the tip assembly that is brought into contact with the display surface 24.

Figure 16A:
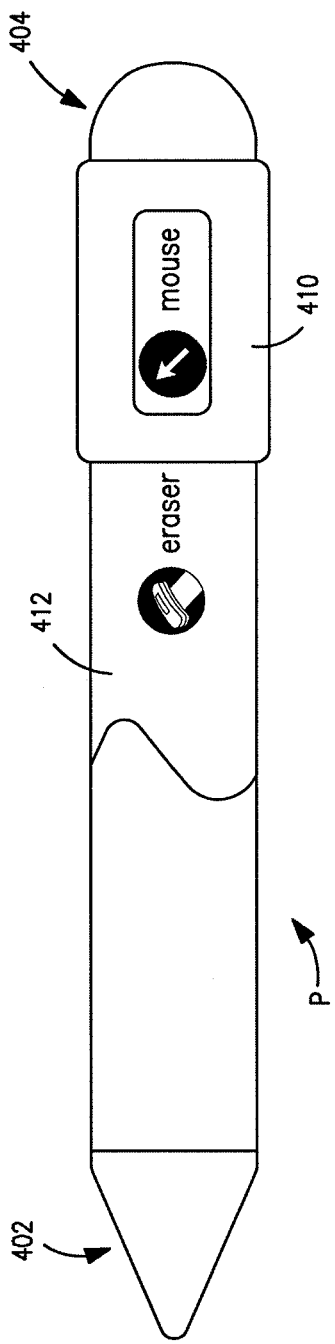
FIGS. 16a and 16b are side elevational views of yet another pen tool for use in conjunction with the interactive input system of FIG. 1.
Figure 16B:
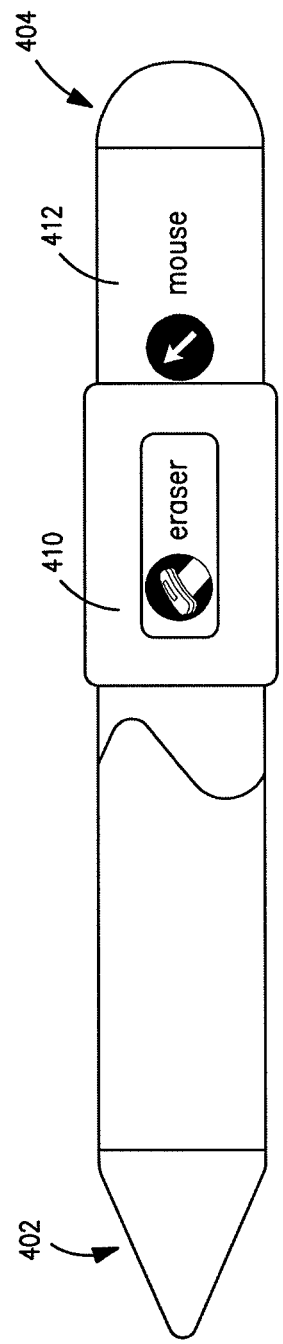

FIGS. 16a and 16b show yet another pen tool P for use in conjunction with the interactive input system 20. In this embodiment, the tip assembly 402 is similar to that in the previous embodiments. The eraser assembly 404 has a more rounded physical configuration. Unlike the previous embodiments, a slider switch 410 that is moveable between mouse and eraser positions is provided on the body 412 of the pen tool P. The position of the slider switch 410 is sensed by the controller 212 and is used to determine the form of the modulated signal that is output by the pen tool P when the eraser assembly 404 is brought into contact with the display surface 24. When the slider switch 410 is positioned in the mouse position as shown in FIG. 16a and the eraser assembly 404 is brought into contact with the display surface 24 with sufficient force to close the switch 254, the pen tool P outputs a modulated signal that is compared to the mapping table by the controller 120 to determine that the pen tool is operating in a pointer mode. The controller 120 in turn assigns pointer mode information to the generated pointer coordinates. Similarly, when the slider switch 410 is positioned in the eraser position as shown in FIG. 14b and the eraser assembly 404 is brought into contact with the display surface with sufficient force to close the switch 254, the pen tool P outputs a differently modulated signal that is compared to the mapping table by the controller 120 to determine that the pen tool is operating in an eraser mode. The controller 120 in turn assigns eraser mode information to the generated pointer coordinates.

FIGS. 17a and 17b show yet another pen tool P for use in conjunction with the interactive input system 20. In this embodiment, tip assemblies 502 and 504 having generally the same physical configuration are provided at opposite ends of the body 506. A slider switch 510 is provided on the body 506 of the pen tool P and is moveable towards the tip assembly 502 between two positions as well as moveable towards the tip assembly 504 between two positions. In particular, the slider switch 510 is moveable towards the tip assembly 502 between ink and eraser positions and towards the tip assembly 504 between select and right click positions. The position of the slider switch 510 is sensed by the controller 212 and used to determine the form of the modulated signal that is output by the pen tool P when a tip assembly is brought into contact with the display surface 24 with sufficient force to close the tip switch assembly 220.

When the slider switch 510 is positioned in the ink position as shown in FIG. 17a and the plunger of the tip assembly 502 is brought into contact with the display surface 24 with sufficient force to close the tip switch assembly 220, the pen tool outputs a modulated signal that is compared to the mapping table by the controller 120 to determine that the pen tool P is operating in an ink mode. The controller 120 in turn assigns ink mode information to the generated pointer coordinates. Similarly, when the slider switch 510 is positioned in the eraser position as shown in FIG. 17b and the plunger of the tip assembly 502 is brought into contact with the display surface 24 with sufficient force to close the tip switch assembly 220, the pen tool outputs a differently modulated signal that is compared to the mapping table by the controller 120 to determine that the pen tool P is operating in an eraser mode. The controller 120 in turn assigns eraser mode information to the generated pointer coordinates. When the slider switch 510 is positioned in the select position as shown in FIG. 17a and the plunger of the tip assembly 504 is brought into contact with the display surface 24 with sufficient force to close the tip switch assembly 220, the pen tool P outputs yet another differently modulated signal that is compared to the mapping table by the controller 120 to determine that the pen tool P is operating in a select mode. The controller 120 in turn assigns select mode information to the generated pointer coordinates. Similarly, when the slider switch 510 is positioned in the right click position as shown in FIG. 17b and the plunger of the tip assembly 504 is brought into contact with the display surface 24 with sufficient force to close this tip switch assembly 220, the pen tool P outputs still yet another differently modulated signal that is compared to the mapping table by the controller 120 to determine that the pen tool is operating in a right click mode. The controller 120 in turn assigns right click mode information to the generated pointer coordinates.

Figure 18:
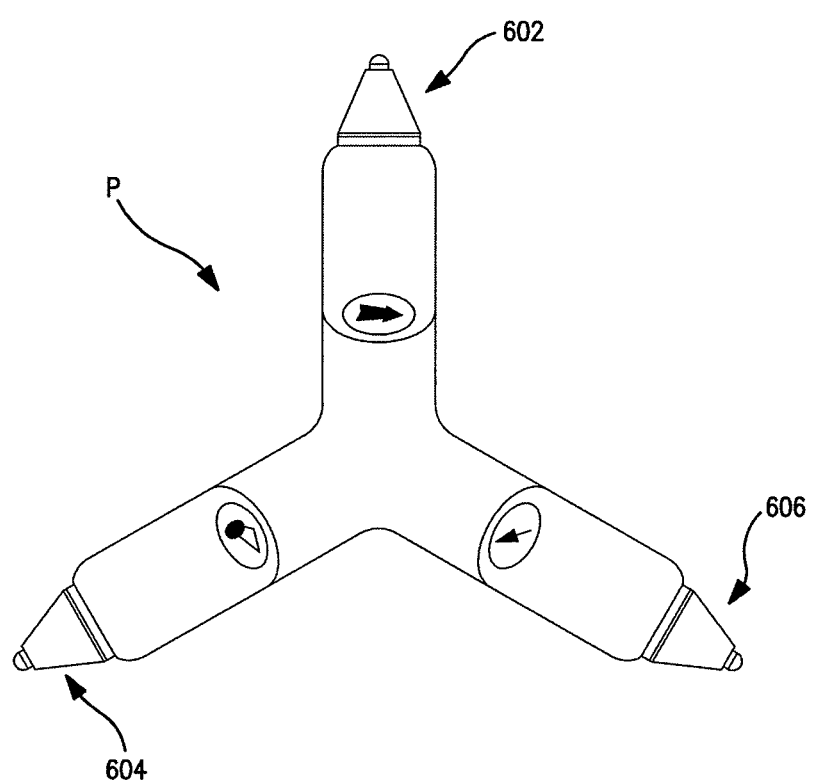
FIG. 18 is a side elevational view of still yet another pen tool for use in conjunction with the interactive input system of FIG. 1.

FIG. 18 shows still yet another pen tool P for use in conjunction with the interactive input system 20. In this embodiment, the pen tool P has three tip assemblies 602 and 606, each of which is associated with a different pen tool mode. In particular, in this embodiment, tip assembly 602 is associated with the ink mode, tip assembly 604 is associated with the eraser mode and tip assembly 606 is associated with the select mode. The modulated signal that is output by the pen tool P differs depending on the tip assembly that is brought into contact with the display surface 24.

Figure 19:
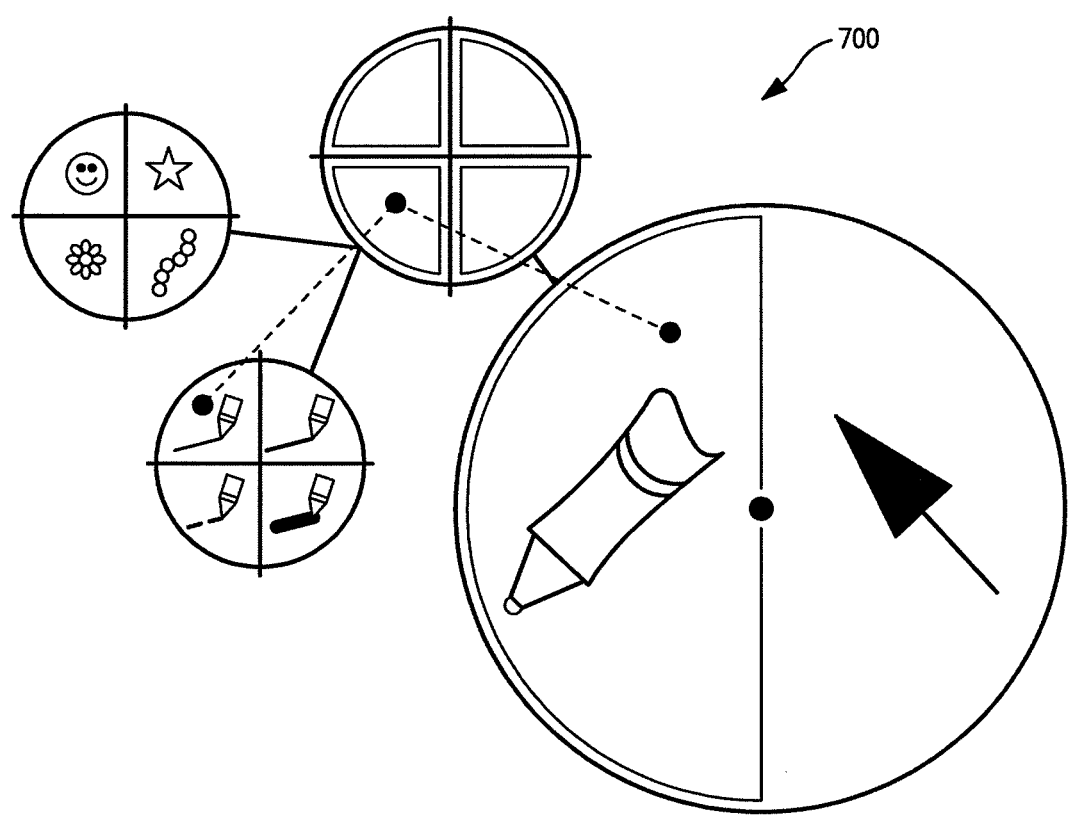
FIG. 19 shows a pop-up menu presented on a display surface of the interactive input system in response to interaction between a pen tool and the display surface.

If desired, rather than having the modulated signal-to-pen tool mode mappings in the mapping table statically assigned, the computer 30 can be responsive to user input to present a graphical user interface 700 that presents the mappings visually and allows the user to change the pen tool mode that is associated with each modulated signal output by the pen tools P as shown in FIG. 19.

In addition to using the modulated signal output by the pen tool P to determine the pen tool type (i.e. its mode of operation), an attribute may be assigned to the modulated signal to control further the manner by which the computer 30 processes pointer coordinates. For example, if the user is contacting the display surface 24 with an eraser assembly (or a tip assembly representing an eraser mode) of a pen tool P, an attribute may be assigned to the modulated signal in the mapping table so that only ink that has been input using that specific pen tool P or only ink of a certain color or only ink bounded by a selected geometric shape (e.g. rectangles, circles, squares, etc.) is erased when the pointer coordinates are processed by the computer 30.

As will be appreciated, although specific pen tool modes are described, those of skill in the art will appreciate that alternative pen tool modes or different combinations of pen tools modes can be assigned to the modulated signals output by the pen tools. Although pen tools P with slider switches are illustrated, pen tools with alternative input interfaces can of course be used to allow the user to select the pen tool mode(s). For example, the pen tool P may comprise multiple button switches, a single button switch that toggles through multiple positions, rotating switches, one or more scroll wheels, pressure or orientation sensitive switches etc. with each switch or switch position being associated with a pen tool operation mode. Alternatively, the pen tool P may include a microphone and the controller 212 may execute voice recognition software to enable the pen tool mode to be selected by the user through input voice commands. Haptic commands such as tapping the edge of the display screen 24 may also be used to enable the pen tool mode to be selected.

Although specific embodiments have been described above with reference to the figures, those of skill in the art will appreciate that other alternatives are available. For example, in the above embodiment, the DSP unit 26 is shown as comprising an antenna 136 and a wireless receiver 138 to receive the modulated signals output by the pen tool P. Alternatively, each imaging assembly 60 can be provided with an antenna and a wireless receiver to receive the modulated signals output by the pen tool P. In this case, modulated signals received by the imaging assemblies are sent to the DSP unit 26 together with the image frames. The pen tool P may also be tethered to the assembly 22 or DSP unit 26 allowing the signals output by the pen tool P to be conveyed to one or more of the imaging assemblies 60 or the DSP unit 26 or imaging assembly(s) over a wired connection.

In the above embodiment, discontinuity values D(x) are examined and processed to determine the existence and location of a pointer. Those of skill in the art will appreciate that the $VIP_{retro}$ and $VIP_{dark}$ values may be processed directly to determine the existence and location of a pointer.

In an alternative embodiment, the imaging assemblies 60 may look across the display surface 24 such that the reflection of the retro-reflective band 102 appearing on the display surface 24 is captured in image frames and appears in the image frames as a light band spaced from and below the bright band 160. During processing of these image frames, each image frame is separated into three regions, namely a dark region corresponding to the contribution from the IR radiation absorbing bands 104 of the bezel segments, a very bright (retro-reflective) region corresponding to the contribution from the retro-reflective bands 102 of the bezel segments and a bright (reflective) region corresponding to the contribution from the reflection of the retro-reflective bands 102 appearing on the display surface 24.

Once separated, the controller 120 generates VIPs for the individual regions and processes the VIPs to determine if a pointer in proximity with the display surface 24 exists and if so, its position in (x,y) coordinates relative to the display surface 24.

In order to detect a pointer in proximity with the display surface 24, after the VIPs for the dark, retro-reflective and reflective regions have been generated, each VIP value of the dark region VIP is subtracted from its corresponding VIP value of the retro-reflective VIP. Each difference is examined to determine if it is less than a threshold level. If so, the pixel column of the retro-reflective VIP is flagged. Afterwards, a dilation procedure is performed to detect spurious flags. In particular, for each flagged pixel column of the retro-reflective VIP, a check is made to determine whether the pixel columns to its left and right are also flagged. If so, the pixel column is flagged as representing a pointer.

A continuity check is then performed. During the continuity check, each VIP value of the dark region VIP is subtracted from its corresponding VIP value of the reflective VIP. Again each difference is examined to determine if it is less than a threshold level. If so, the pixel column of the reflective VIP is flagged. A dilation similar to that described above is performed with respect to the flagged pixel columns of the reflective VIP. Following this, in order to locate the pointer, the flagged pixel columns of the retro-reflective VIP and the reflective VIP are compared to detect overlapping flagged pixel columns. If overlapping pixel columns are detected, the pixel columns at the boundaries of the overlap in the reflective VIP are deemed to represent the edges of the pointer. The pixel column at the midpoint between the boundary pixel columns is then deemed to represent the location of the pointer in the image frame.

Figure 20:
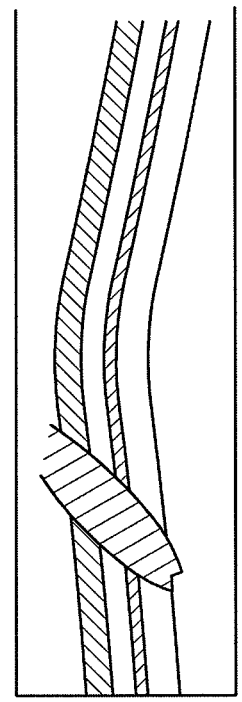
FIG. 20 shows a front elevational view of a portion of an alternative bezel segment.

In the above embodiments, each bezel segment 40 to 44 is shown as comprising a pair of bands having different reflective properties, namely retro-reflective and IR radiation absorbing. Those of skill in the art will appreciate that the order of the bands may be reversed. Also, bands having different reflective properties may be employed. For example, rather than using a retro-reflective band, a band formed of highly reflective material may be used. Alternatively, bezel segments comprising more than two bands with the bands having differing or alternating reflective properties may be used. For example, each bezel segment may comprise two or more retro-reflective bands and two or more radiation absorbing bands in an alternating arrangement. Alternatively, one or more of the retro-reflective bands may be replaced with a highly reflective band. When the image frames are separated into different regions and processed, upper regions are particularly useful during processing to detect pointer existence but not necessarily pointer location. As will be appreciated, if the pointer is brought towards the display surface 24 at a sharp angle, its position in an upper band relative to the display surface 24 may differ significantly from the position of the pointer tip in the band proximate to the display surface 24 as shown in FIG. 20.

If desired the tilt of each bezel segment can be adjusted to control the amount of light reflected by the display surface itself and subsequently toward the image sensors 70 of the imaging assemblies 60.

Although the frame assembly is described as being attached to the display unit, those of skill in the art will appreciate that the frame assembly may take other configurations. For example, the frame assembly may be integral with the bezel 38. If desired, the assembly 22 may comprise its own panel to overlie the display surface 24. In this case it is preferred that the panel be formed of substantially transparent material so that the image presented on the display surface 24 is clearly visible through the panel. The assembly can of course be used with a front or rear projection device and surround a substrate on which the computer-generated image is projected.

Although the imaging assemblies are described as being accommodated by the corner pieces adjacent the bottom corners of the display surface, those of skill in the art will appreciate that the imaging assemblies may be placed at different locations relative to the display surface. Also, the tool tray segment is not required and may be replaced with a bezel segment.

Those of skill in the art will appreciate that although the operation of the interactive input system 20 has been described with reference to a single pointer or pen tool P being positioned in proximity with the display surface 24, the interactive input system 20 is capable of detecting the existence of multiple pointers/pen tools that are proximate to the touch surface as each pointer appears in the image frames captured by the image sensors.

Although preferred embodiments have been described, those of skill in the art will appreciate that variations and modifications may be made with departing from the spirit and scope thereof as defined by the appended claims.

What is claimed is:

1. An interactive input system comprising:
 a bezel at least partially surrounding a region of interest, a surface of said bezel facing said region of interest having a plurality of generally parallel, longitudinally extending bands thereon with all adjacent bands having different optical properties and wherein said bands comprise at least one band that reflects illumination and at least one band that absorbs illumination, all of said longitudinally extending bands being adapted to be disposed above a display surface within the region of interest;
 at least one imaging device looking into said region of interest in a direction substantially orthogonal to the plane of the surface of said longitudinally extending bands and seeing the surface of said at least one bezel so that images acquired by said at least one imaging device comprise regions corresponding to said bands; and
 processing structure processing pixels corresponding to the adjacent bands having different optical properties to detect the existence of a pointer in said region of interest, wherein during said processing, said processing structure determines differences between pixel intensity profiles calculated for each of said adjacent bands and compares the pixel intensity profile of each of said adjacent bands to detect at least one discontinuity between adjacent bands.

2. An interactive input system according to claim 1 wherein said at least one band that reflects illumination comprises a band of retro-reflective material.

3. An interactive input system according to claim 2 wherein said at least one band that absorbs illumination comprises a band of infrared light absorbing material.

4. An interactive input system according to claim 1 wherein said at least one band that absorbs illumination comprises a band of infrared light absorbing material.

5. An interactive input system according to claim 3 wherein said bezel comprises at least one generally planar surface on which said bands are provided, the plane of said at least one bezel surface being generally normal to the plane of said display surface.

6. An interactive input system according to claim 5 wherein said bands comprise at least one band that reflects illumination and at least one band that absorbs illumination.

7. An interactive input system according to claim 6 wherein said at least one band that reflects illumination comprises a band of retro-reflective material.

8. An interactive input system according to claim 6 wherein said at least one band that absorbs illumination comprises a band of infrared light absorbing material.

9. An interactive input system according to claim 1 wherein said bezel comprises at least one generally planar surface on which said bands are provided, the plane of said at least one bezel surface of said bezel being generally normal to the plane of said generally planar surface.

10. An interactive input system comprising:
 a bezel at least partially surrounding a region of interest, a surface of said bezel facing said region of interest having a plurality of longitudinally extending bands thereon with all adjacent bands having different optical properties and wherein said bands comprise at least one band that reflects illumination and at least one band that absorbs illumination, all of said longitudinally extending bands being adapted to be disposed above a display surface within the region of interest;
 at least one imaging device looking into said region of interest in a direction substantially orthogonal to the plane of the surface of said longitudinally extending bands and seeing the surface of said bezel; and
 processing structure communicating with said at least one imaging device and processing image data generated by said at least one imaging device corresponding the adjacent bands having different optical properties to detect the existence of a pointer in said region of interest irrespective of pointer type, wherein during said processing, said processing structure processes said image data to determine differences between pixel intensity profiles calculated for each of said adjacent bands and compares the pixel intensity profile of each of said adjacent bands to detect at least one discontinuity between adjacent bands caused by the existence of said pointer.

11. An interactive input system according to claim 10, wherein the optical properties of said bands are selected from (i) reflective, (ii) retro-reflective, and (iii) radiation absorbing.

12. An interactive input system according to claim 11 wherein said bands are generally horizontal.

13. An interactive input system according to claim 11 wherein said bezel comprises at least one generally planar surface on which said bands are provided, the plane of said at least one bezel surface being generally normal to the plane of said display surface.

14. An interactive input system according to claim 11 wherein said bezel comprises two bands.

15. An interactive input system according to claim 14 wherein said bezel comprises a retro-reflective band and a radiation absorbing band.

16. An interactive input system according to claim 14 wherein said bezel comprises at least three bands.

* * * * *